US009218724B2

(12) United States Patent
Pawloski

(10) Patent No.: US 9,218,724 B2
(45) **Date of Patent: *Dec. 22, 2015**

(54) ELECTRONIC GAMING DEVICE WITH QUASI-PERSISTENT SYNCHRONIZED REEL GAMES

(71) Applicant: Jason Pawloski, Decatur, GA (US)

(72) Inventor: Jason Pawloski, Decatur, GA (US)

(73) Assignee: CADILLAC JACK, INC., Duluth, GA (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/862,689

(22) Filed: Apr. 15, 2013

(65) Prior Publication Data

US 2014/0309011 A1 Oct. 16, 2014

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/3265* (2013.01)

(58) Field of Classification Search
None
See application file for complete search history.

(56) References Cited

U.S. PATENT DOCUMENTS

2004/0048657 A1* 3/2004 Gauselmann .................. 463/25
2006/0258424 A1* 11/2006 Green ............................ 463/16
2008/0026815 A1* 1/2008 Okada ............................ 463/20
2010/0197377 A1* 8/2010 Aoki et al. ...................... 463/20
2010/0210343 A1* 8/2010 Englman et al. ................ 463/20
2012/0088567 A1* 4/2012 Aoki et al. ...................... 463/20
2012/0231868 A1* 9/2012 Guinn ............................ 463/20
2013/0065662 A1* 3/2013 Watkins et al. ................. 463/20
2014/0066165 A1* 3/2014 Watkins et al. ................. 463/20

* cited by examiner

*Primary Examiner* — Jason Yen
(74) *Attorney, Agent, or Firm* — CF3; Stephen Eisenmann

(57) ABSTRACT

Examples disclosed herein relate to systems and methods, which may receive wagers on one or more paylines. The systems and methods may initiate one or more quasi-persistent synchronized reel structures. The systems and methods may determine one or more replacement symbols for the one or more symbols of the plurality of primary game symbols. The systems and methods may determine one or more payouts based on the additional gaming functionality. The systems and methods may display one or more presentations based on the additional gaming functionality.

11 Claims, 19 Drawing Sheets

ELECTRONIC GAMING DEVICE WITH QUASI-PERSISTENT SYNCHRONIZED REEL GAMES

FIELD

The subject matter disclosed herein relates to an electronic gaming system and method of implementing a wagering game on an electronic gaming system. More specifically, the disclosure relates to an electronic gaming system and methods that provides quasi-persistent synchronized reel gaming functionality.

INFORMATION

The gaming industry has numerous casinos located both worldwide and in the United States, and both land-based and online. A client of a casino or other gaming entity can gamble via various games of chance. For example, craps, roulette, baccarat, blackjack, and electronic or electromechanical games (e.g., a slot machine, a video poker machine, and the like) where a person may gamble on an outcome.

Historically, the success of electronic gaming systems is dependent on several elements, which may not be readily apparent. Success can depend upon the prospect of winning money from the gaming system, whether such prospect is real or perceived which can carry an intrinsic entertainment value as compared to other gaming system offerings. Additionally, the success can also depend upon the ease by which a new player can understand the game mechanics, as it is unlikely that a new player will expend money wagering on a gaming system if they do not understand the game mechanics. A player's enjoyment and interest in a game may be increased by employing an electronic gaming system and methods that provides quasi-persistent synchronized reel gaming functionality.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
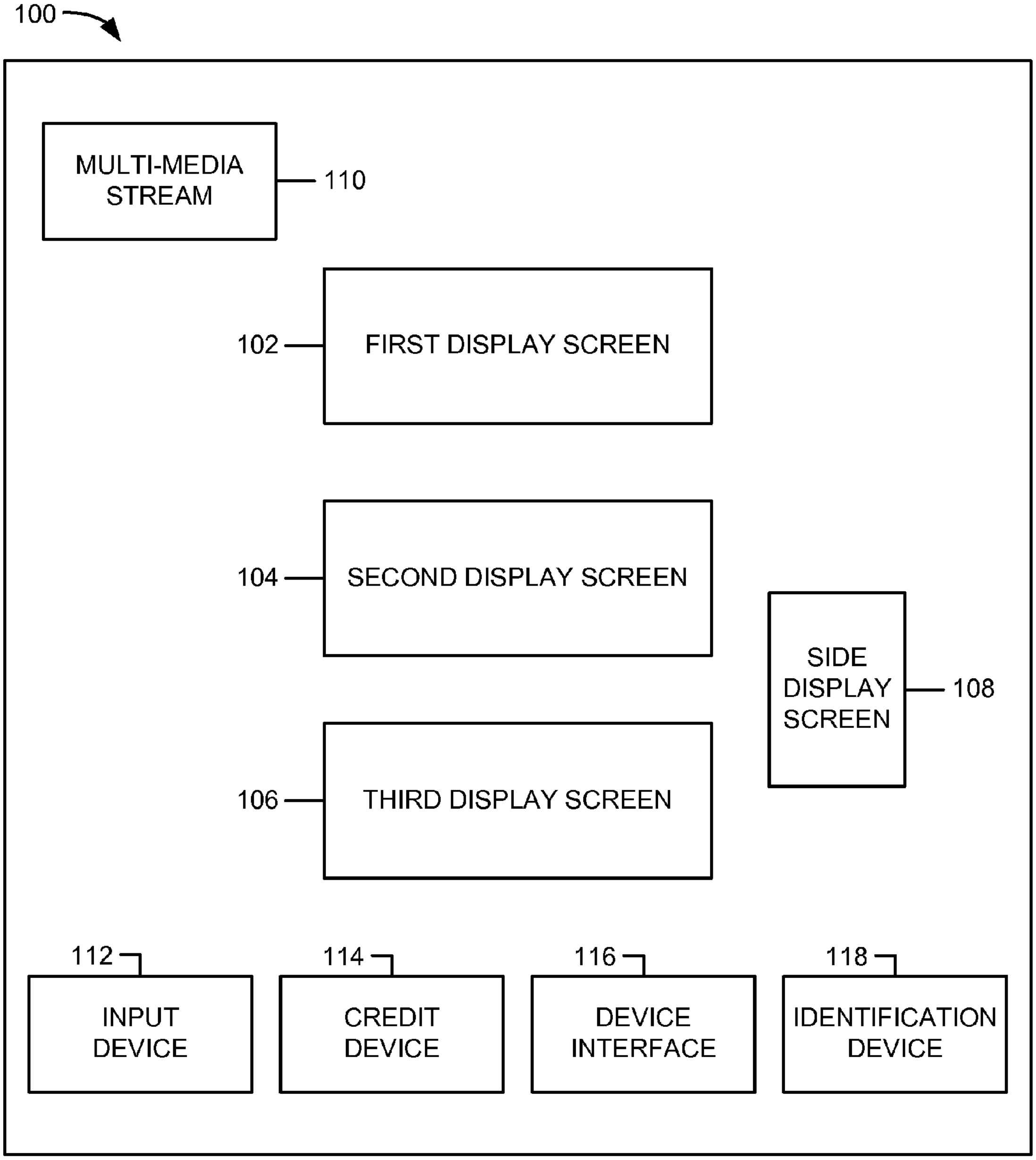
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select one or more quasi-persistent synchronized reel gaming functionality, to control any object (e.g., a tool, a person, an image, a selection option, etc.), to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more quasi-persistent synchronized reel gaming functionality may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only quasi-persistent synchronized reel gaming functionality (or similar functionality). Therefore, no games without quasi-persistent synchronized reel gaming functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

The presentations associated with embedded gaming based game may be presented on one, a few, and/or a plurality of screens. These presentations associated with quasi-persistent synchronized reel gaming functionality may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
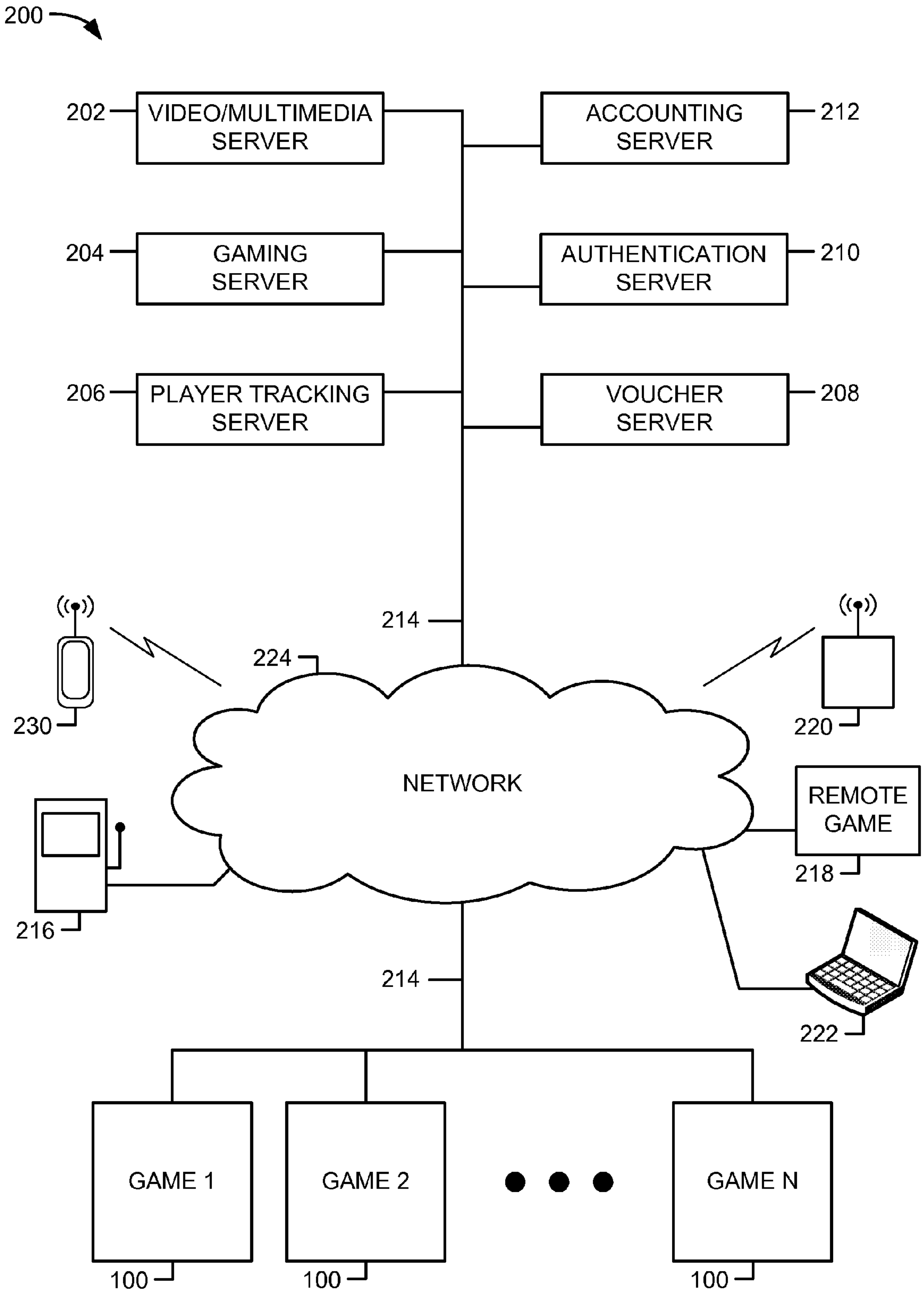
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a quasi-persistent synchronized reel gaming functionality, a quasi-persistent synchronized reel gaming evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include quasi-persistent synchronized reel gaming play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more quasi-persistent synchronized reel based game play (or similar game play). This data may include the number of times a specific item (e.g., a first part of reel one, reel one, a first part of reel two, a second part of reel two, a rose, a star, etc.) was selected and/or replaced. The frequency of any specific item being selected and the amount won. This data may also include data relating to any interrelationship of elements. For example, when a first part of reel one is replaced with a first replacement symbol, then 30% of the time a second part of reel one is replaced with the first replacement symbol, and then 15% of the time a third part of reel one is replaced with the first replacement symbol. In another example, when a first part of reel one is replaced with a first replacement symbol, then 45% of the time a second part of reel two is replaced with the second replacement symbol, and then 10% of the time a third part of reel three is replaced with the third replacement symbol. In another example, when the star is selected, the player selects a rose on 75% of the time. Further, this selection pairing results in a winning result 55% of the time.

Figure 3:
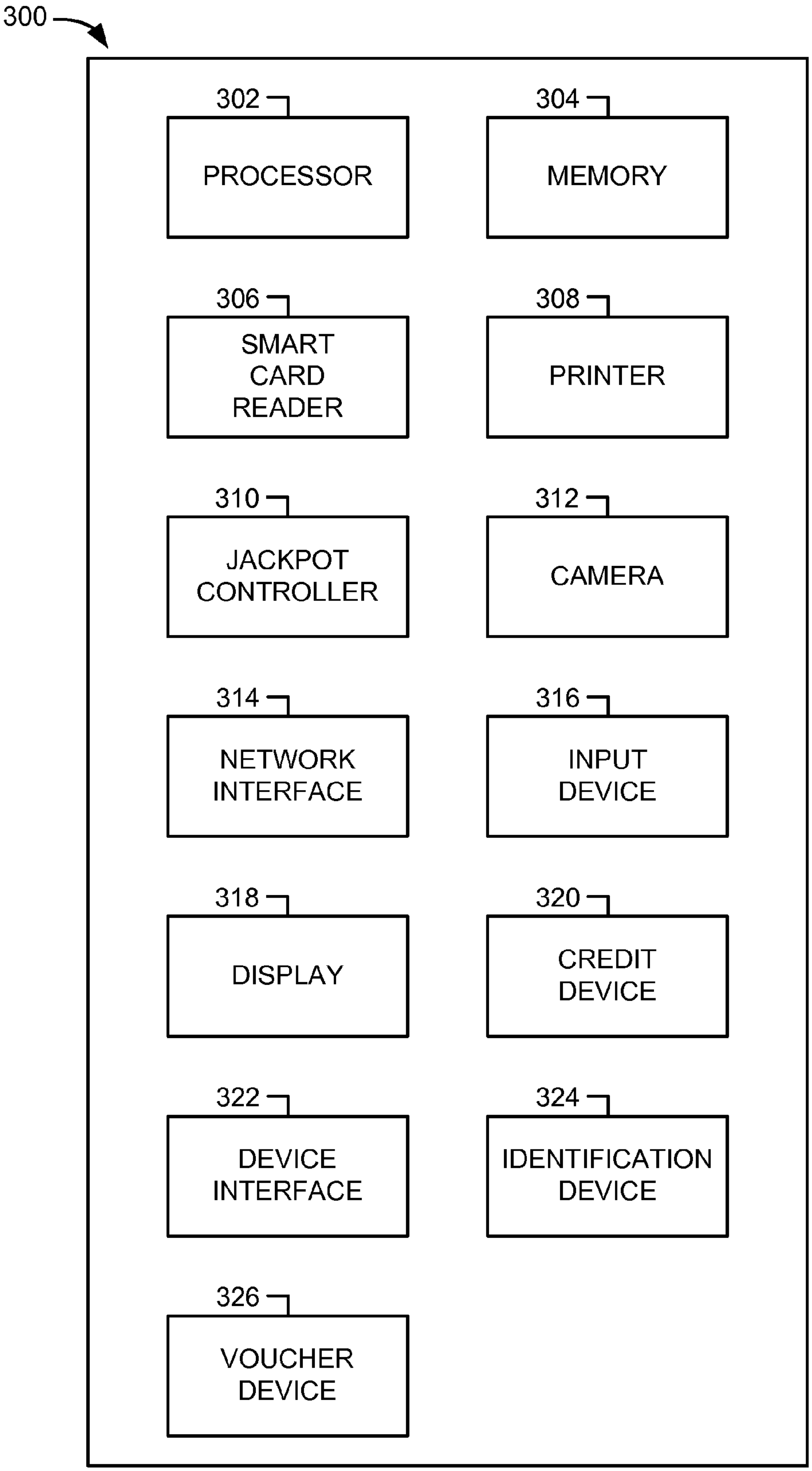
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more quasi-persistent synchronized reel gaming functionality, to select one or more game elements, to select one or more theme-based gaming options, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
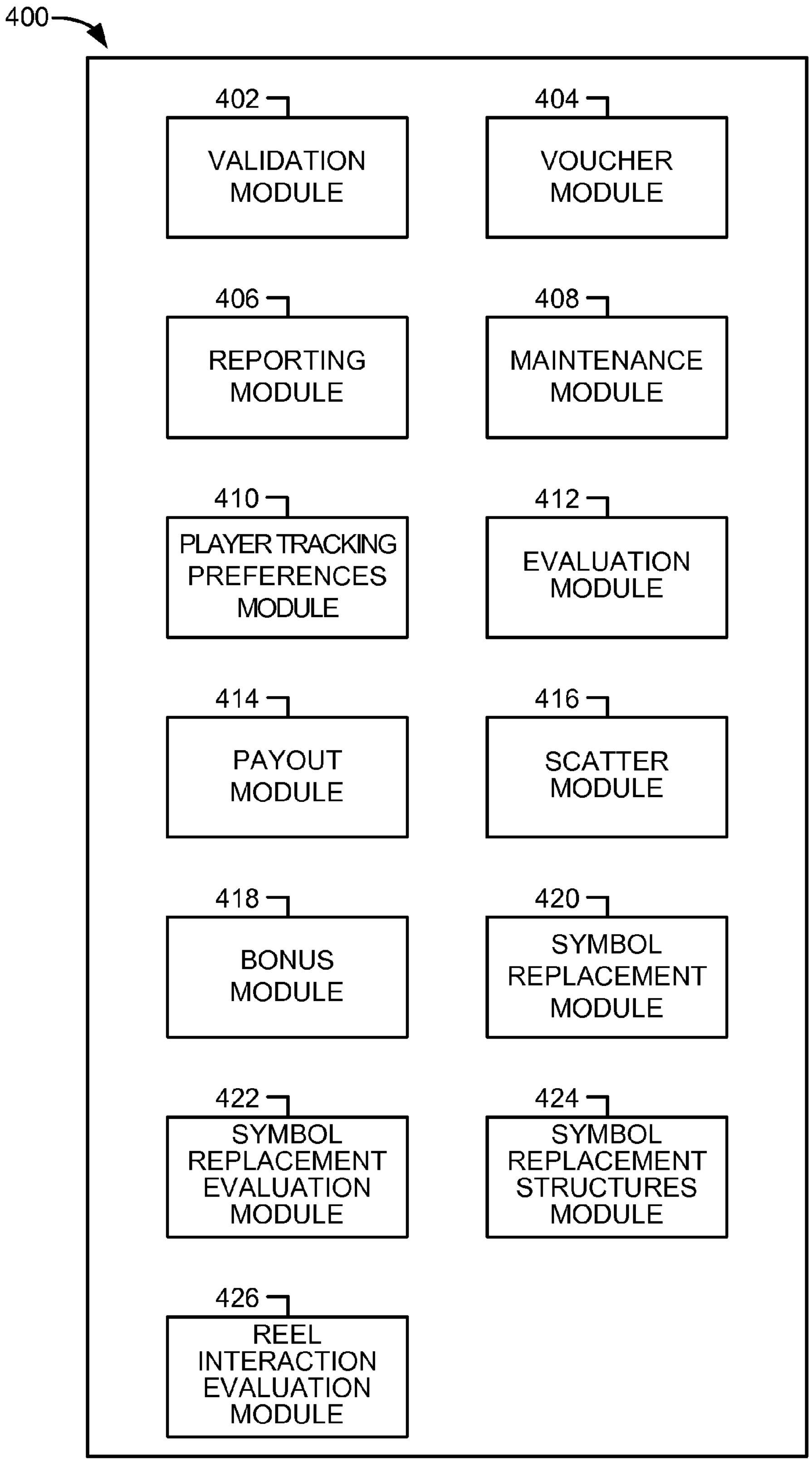
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a scatter module 416, a bonus module 418, a symbol replacement module 420, a symbol replacement evaluation module 422, a symbol replacement structures module 424, and/or a reel interaction evaluation module 426.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events which may not be based on one or more outcomes for one or more quasi-persistent synchronized reel gaming functionality based game play. Evaluation module 412 may evaluate one or more outcomes for one or more events which may be based on one or more outcomes for one or more quasi-persistent synchronized reel gaming functionality based game play Payout module 414 may determine one or more payouts which may relate to one or more inputs received from the player, electronic gaming device 100, and/or electronic gaming system 200. Payout module 418 may determine one or more payouts based on one or more selections.

Scatter module 416 may determine one or more scatter structures and/or store any data relating to one or more scatter symbols.

Bonus module 418 may generate a bonus game, evaluate the results of the bonus game, trigger bonus game presentations, generate bonus game payouts, and/or display any data relating to the bonus game.

Symbol replacement module 420 may generate, compile, transmit, and/or store one or more quasi-persistent synchronized reel gaming functionality structures. Symbol replacement module 420 may compile data (e.g., utilization rate, win rate, etc.) relating to one or more quasi-persistent synchronized reel gaming functionality structures.

Symbol replacement evaluation module 422 may evaluate one or more outcomes for one or more events which may be based on one or more outcomes for one or more quasi-persistent synchronized reel gaming functionality.

Symbol replacement structures module 424 may store, generate, compile, and/or transmit data relating to one or more symbol replacement structures.

Reel interaction evaluation module 426 may evaluate, store, generate, compile, and/or transmit data relating to one or more reel interactions.

A presentation generation module may generate the presentation data (e.g., visual and audio) relating to one or more game play options. A presentation module may display one or more of the generated presentations.

It should be noted that one or more modules may be combined into one module. Further, there may be one evaluation module where the determined payout does not depend on whether there were any wild symbols, scatter symbols; quasi-persistent synchronized reel gaming functionality based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
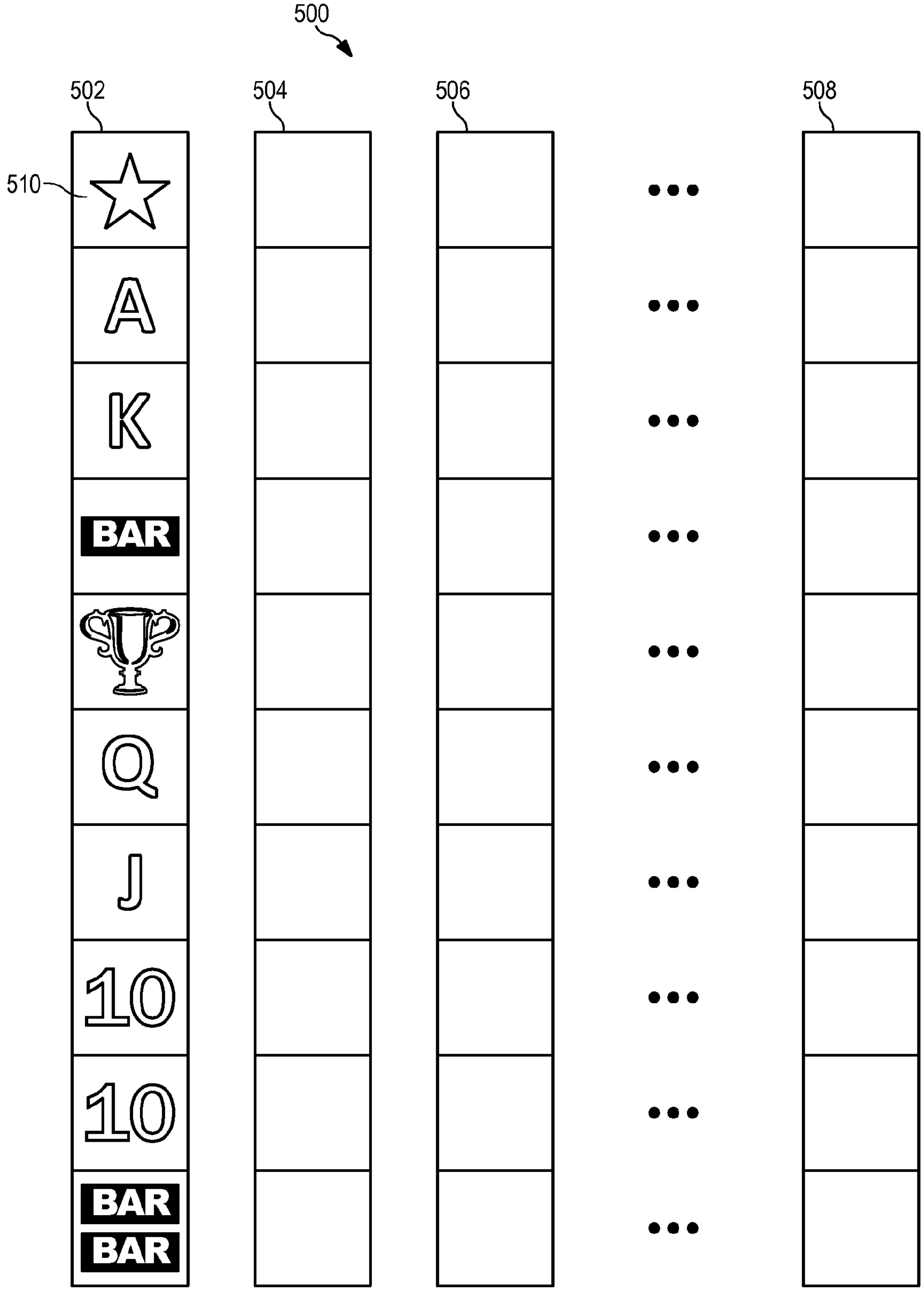
FIG. 5A is an illustration of a reel gaming functionality on an exemplary gaming system, according to one embodiment.

In FIG. 5A, an illustration of a reel gaming 500 on an exemplary gaming system is shown, according to one embodiment. The image includes a first reel 502, a second reel 504, a third reel 506, an Nth reel 508, and/or one or more symbols 510. One or more symbols may be any symbol utilized in a gaming system and/or slot machine. It should be noted that first reel 502 will be utilized to illustrate parts of this disclosure. However, any reel (e.g., second reel 504, third reel 506, and/or Nth reel 508) and/or reels may be substituted for first reel 502 to utilize any of the information in this disclosure.

Figure 5B:
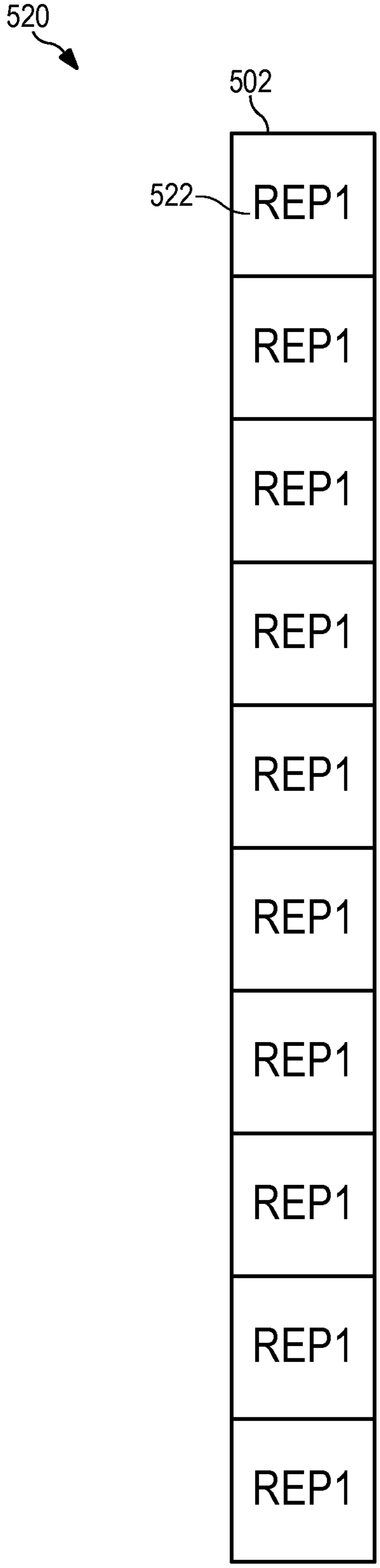
FIG. 5B is an illustration of a replacement symbol reel gaming functionality on an exemplary gaming system, according to one embodiment.

In FIG. 5B, an illustration of a replacement reel gaming functionality 520 on an exemplary gaming system is shown, according to one embodiment. In this example, one or more symbols 510 on first reel 502 may be replaced by one or more replacement symbols 522. For example, the symbols (e.g., a star, an ace, a king, a bar, a trophy, a queen, a jack, a ten, another ten, and/or a double bar), which were on first reel 502 may be replaced with a replacement symbol (e.g., an ace, a wild, a scatter, a king, etc.).

Figure 5C:
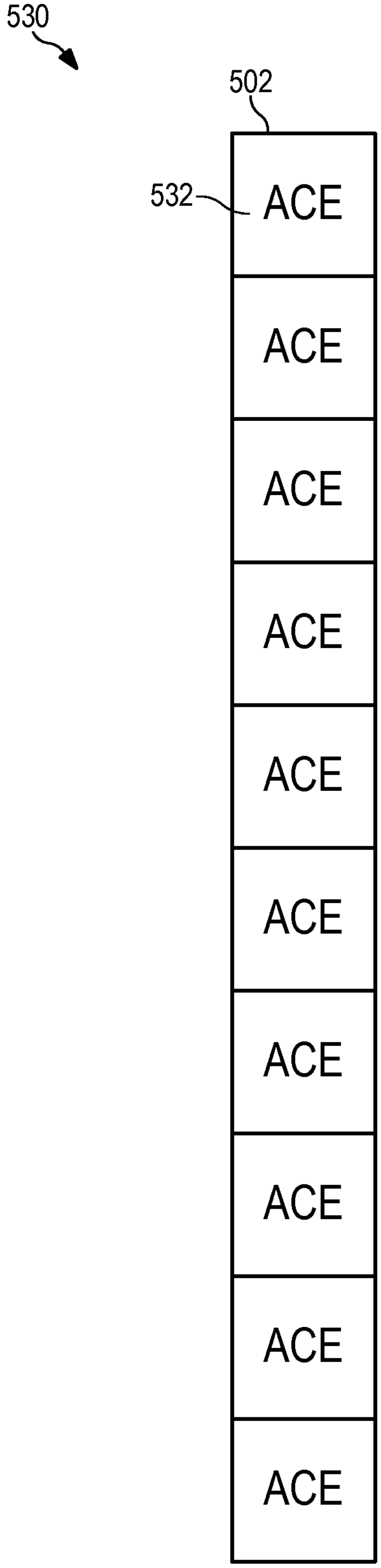
FIG. 5C is another illustration of a replacement reel gaming functionality on an exemplary gaming system, according to one embodiment.

In FIG. 5C, another illustration of replacement reel gaming functionality 530 on an exemplary gaming system is shown, according to one embodiment. In this example, one or more symbols 510 have been replacement with one or more replacement symbols 532. For example, an ace may be utilized as the replacement symbol to generate a new display on first reel 502.

Figure 5D:
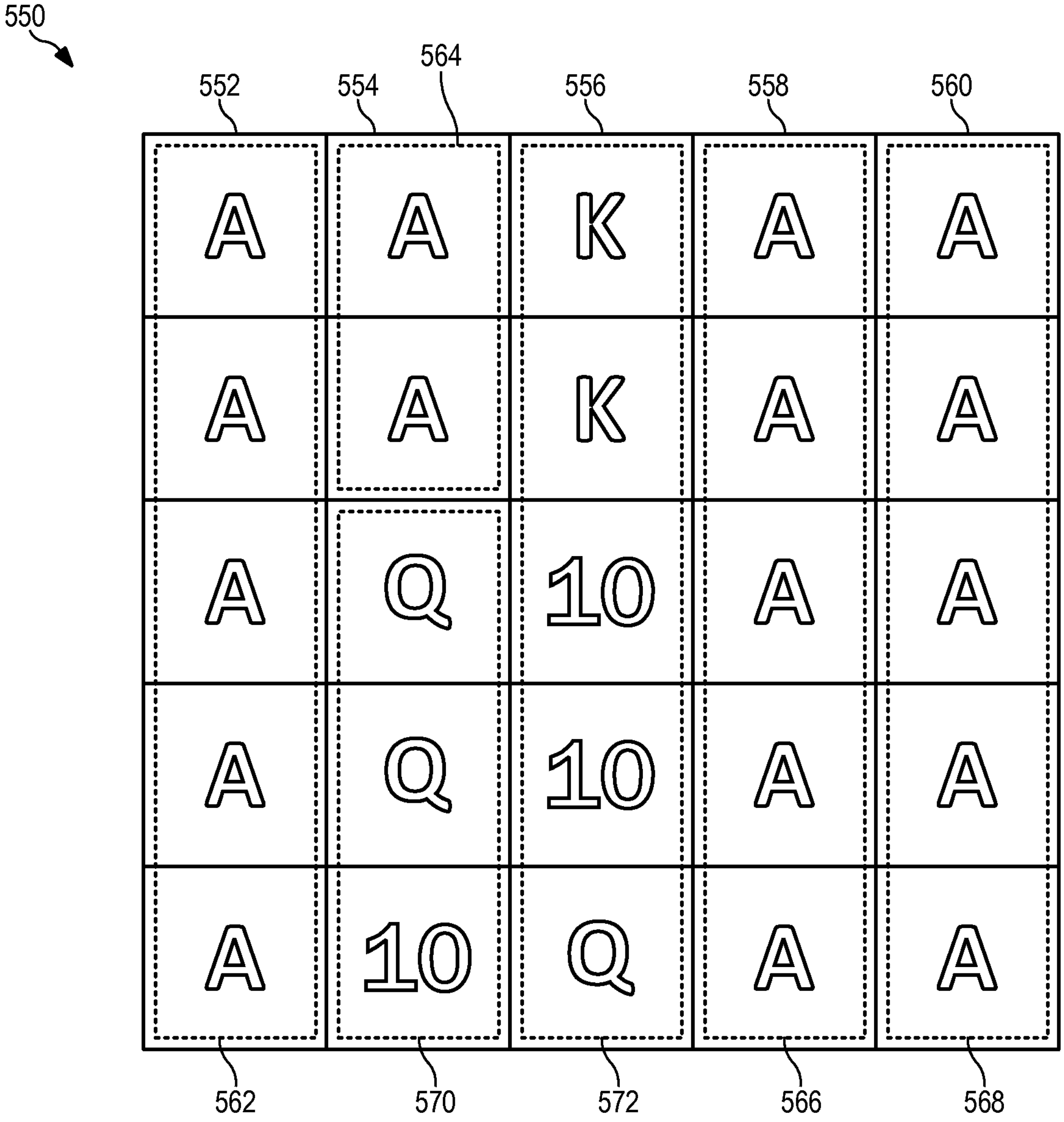
FIG. 5D is another illustration of a quasi-persistent synchronized reel gaming functionality on an exemplary gaming system, according to one embodiment.

In FIG. 5D, an illustration of a quasi-persistent synchronized reel gaming functionality 550 on an exemplary gaming system is shown, according to one embodiment. In one example, a first reel 552 may have one or more sections (e.g., 1-N), which may allow one or more symbols and/or symbol sections to be replaced. In this example, first reel 502 has a first replacement section 562. It should be noted that any number (e.g., 1-N) of replacement sections may be utilized with this disclosure. In another example, a second reel 554 may have a first replacement section 564 and a second replacement section 570. A third reel 556 may have a first replacement section 572. A fourth reel 558 may have a first replacement section 566 and a fifth reel 560 may have a first replacement section 568. In this example, a first symbol (e.g., an ace) is in every symbol area for first replacement section 562 on first reel 552, first replacement section 564 on second reel 554, first replacement section 566 on fourth reel 558, and first replacement section 568 on fifth reel 560. It should be noted that any number (e.g., 1-N) of symbols may be utilized in isolation and/or combinations.

Figure 5E:
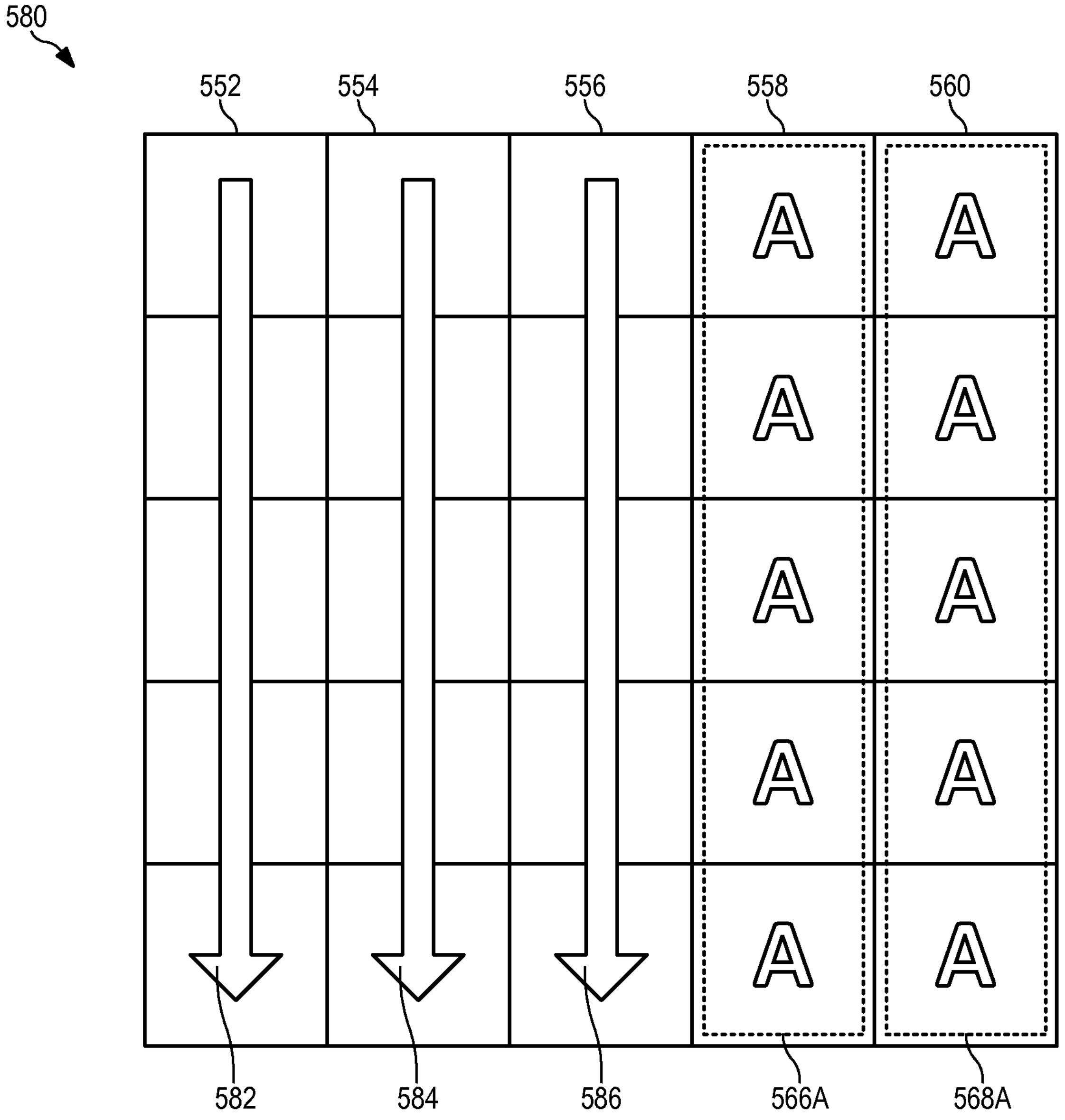
FIG. 5E is another illustration of a quasi-persistent synchronized reel gaming functionality on an exemplary gaming system, according to one embodiment.

In one example, the symbols (e.g., Aces) on fourth reel 558 and fifth reel 560 are held (e.g., represented by reference numbers 566A and 568A) while the symbols on first reel 552, second reel 554, and third reel 556 are respun (see FIG. 5E) which are represented by reference numbers 582, 584, and 586. In one embodiment, the term held means replacement symbols are held over from one or more previous spins. In another example, the replacements for the reels that aren't held over from the previous spin are chosen in such a way that it keeps the overall payback constant. In one example, the symbols and/or replacement symbols are determined via a look-up table. In another example, a random number generator is utilized to determine the symbols and/or the replacement symbols. In another example, the symbols (e.g., Aces) on fourth reel 558, fifth reel 560, first reel 552, and/or first replacement section 564 of second reel 554 are held while the symbols on second replacement section 570 of second reel 554 and third reel 556 are respun.

In another example, first replacement section may include a first replacement symbol area, second replacement section may include a second replacement symbol area, and/or third replacement section may include a third replacement symbol area. In various examples, any number (e.g., 1-N) of replacement symbols may be utilized in any combination. For example, first replacement section may have two replacement symbols. In another example, first replacement section may have ten replacement symbols. In another example, second replacement section may have one hundred replacement symbols. The various replacement sections may have the same replacement symbols, different replacement symbols, and/or any combination thereof. For example, a replacement symbol for second replacement section and a third replacement section may be the same. Whereas, the replacement symbol for a first replacement section may be different than the replacement symbol for second replacement section and/or third replacement section.

Further, the size of the replacement sections may be constant, vary, and/or any combination thereof. For example, first replacement section, second replacement section, and third replacement section may have the same number of symbol areas (e.g., 1, 2, 3, . . . , N). In another example, first replacement section may have four symbol areas. In this example, second replacement section may have three symbol areas. Further in this example, third replacement section may have two symbol areas. In another example, first replacement section may have four symbol areas. In this example, second replacement section may have three symbol areas. Further in this example, third replacement section may have three symbol areas.

Figure 6A:
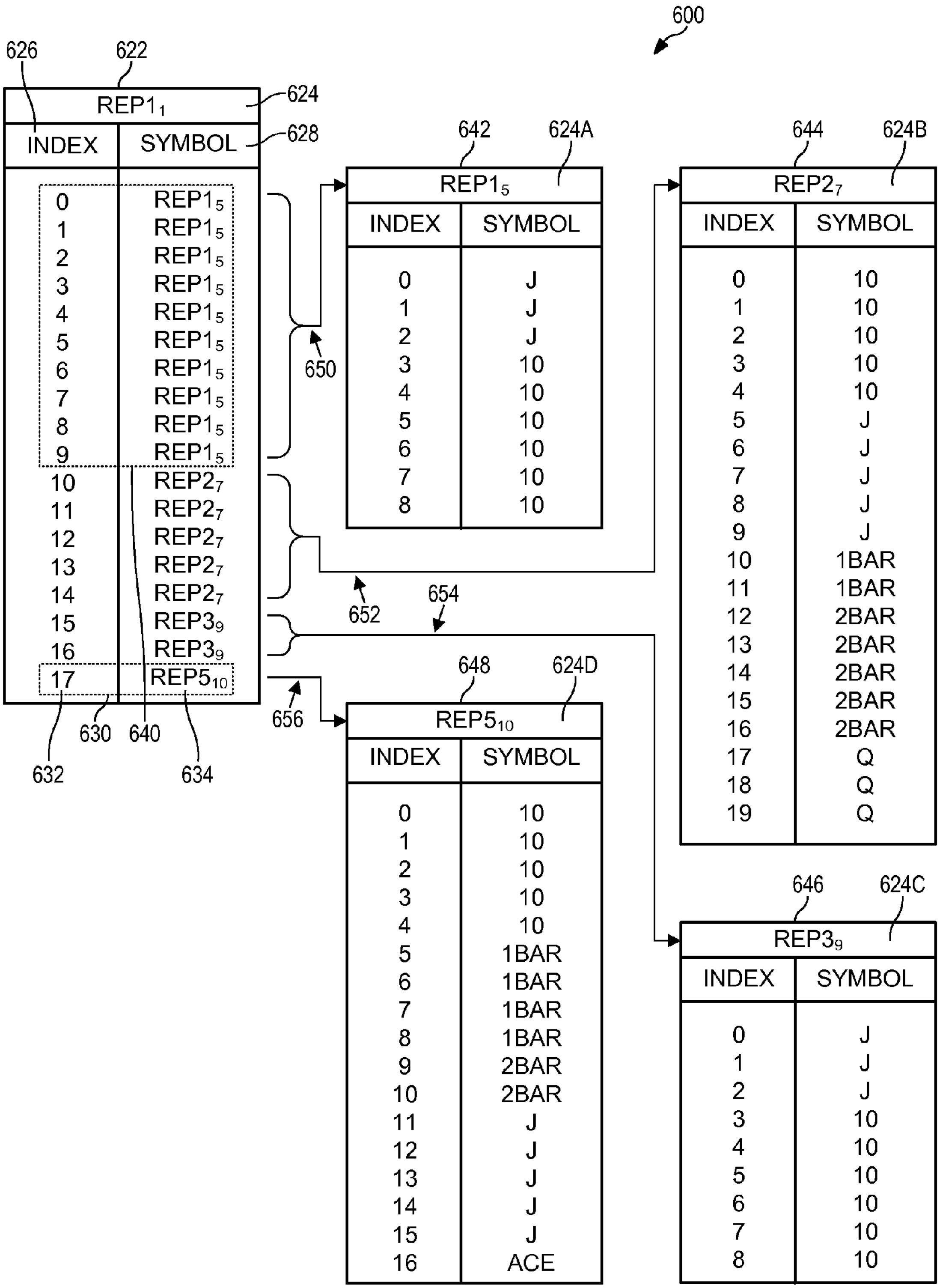
FIG. 6A is an illustration of a synchronized reel gaming functionality on an exemplary gaming system, according to one embodiment.

In FIG. 6A, an illustration of one structure for a quasi-persistent synchronized reel gaming functionality 600 on an exemplary gaming system is shown, according to one embodiment. In one example, a first weighted table 622, a second weighted table 642, a third weighted table 644, a fourth weighted table 646, and a fifth weighted table 648 are shown. In should be noted that the table may be weighted, not weighted, and/or a combination of both (e.g., some tables are weighted while other tables are not weighted).

In one example, the system and/or method may find 18 entries (e.g., 0-17) in first weighted table 622, therefore, the system and/or method commands the RNG to return a random number between 0 and 17. In one example, if the number is between 0 and 9 inclusive, the system and/or method looks at the symbol and finds that it points to second weighted table 642 because the numbers 0 to 9 where in a first grouping 640. In this example, the system and/or method determines that nine entries (e.g., 0 to 8) are in second weighted table 642, therefore, the system and/or method commands the RNG to return a random number between 0 and 8. In one example, the RNG produces a 3, which determines that a replacement symbol for $REP1_5$ will be a ten. In these examples, first weighted table 622 was related to $REP1_1$ (e.g., first replacement area), second weighted table 642 was related to $REP1_5$ (e.g., a fifth replacement area) which was located on a fifth reel, third weighted table 644 was related to $REP2_7$ (e.g., a second replacement area) which was located on a seventh reel, fourth weighted table 646 was related to $REP3_9$ (e.g., a third replacement area) which was located on a ninth reel, and fifth weighted table 648 was related to $REP5_{10}$ (e.g., a fifth replacement area) which was located on a tenth reel.

First weighted table 622 may include first grouping 640, a second grouping 641, a third grouping 643, and a fourth grouping 630. If the RNG produced a number between 10 and 14, then the system and/or method would select second grouping 641, which would indicate that the system and/or method should go to third weighted table 644. If the RNG produced a number between 15 and 16, then the system and/or method would select third grouping 643, which would indicate that the system and/or method should go to fourth weighted table 646. If the RNG produced the number 17, then the system and/or method would select fourth grouping 630, which would indicate that the system and/or method should go to fifth weighted table 648.

First weighted table 622 may include a first index area 626, a first symbol area 628, one or more index numbers 632, one or more replacement area numbers 634, and/or one or more pointers (e.g., a first pointer 650, a second pointer 652, a third pointer 654, a further pointer 656, etc.).

One or more weighted tables may include one or more title areas (e.g., a first weighted table title area 624, a second weighted table title area 624A, a third weighted table title area 6248, a third weighted table title area 624C, a fourth weighted table title area 624D, etc.).

In another example, first reel 502 may include a first replacement section, a second replacement section, and a third replacement section. First replacement section may include first replacement symbol area, second replacement section may include second replacement symbol area, and/or third replacement section may include third replacement symbol area.

In one example, the system and/or method may determine to replace one or more symbols in first replacement symbol area with one or more replacement symbols. Further, the system and/or method may determine to replace one or more symbols in first replacement section with one or more replacement symbols. In this example, the replacement symbol is an ace. The system and/or method may then determine whether to replacement one or more symbols in second replacement symbol area, third replacement symbol area, second replacement section, and/or third replacement section with one or more replacement symbols.

In one example, the system and/or method determines that no additional replacement symbols should be utilized in second replacement symbol area, third replacement symbol area, second replacement section, and/or third replacement section. In one example, the one or more symbols are not replaced by any replacement symbols and are displayed in second replacement section and/or third replacement section.

In this example, the system and/or method may then determine whether to replacement one or more symbols in second replacement symbol area, third replacement symbol area, second replacement section, and/or third replacement section with one or more replacement symbols. In this example, one or more replacement symbols are utilized to replace the original symbols in one or more of second replacement symbol area and second replacement section. In this example, the one or more replacements symbols are an ace. In this example, the system and/or method determines that no additional replacement symbols should be utilized in third replacement symbol area and/or third replacement section. In one example, the one or more symbols are not replaced by any replacement symbols and are displayed in third replacement section.

This disclosure teaches an extension of synchronized reel game play dynamic in which a large section of the reel strip is replaced with one or more symbols, to a game play dynamic that permits the varying of the length of the size of the sections of contiguous replacement symbols on the reel strip.

Synchronized reel games may select one or more symbols per reel for the replacement symbol. In one example, the number of symbol positions on the reel for a single replacement symbol may remain fixed. Therefore, the selection of a high-paying symbol—something that is necessarily uncommon—is extremely valuable, while choosing a low-paying symbol—something that is necessarily common—is not as valuable. This disparity in pays may restrict the designer's ability to maximize the size of the replacement stacks or other key game attribute.

In one example, an important differentiation for this disclosure is that there are several sections of a particular reel strip which may be replaced separately but dependently from each other.

In another example, a game may behave by replacing all of the symbols on a reel strip uniformly by transforming all of the symbols on the reel strip into one replacement symbol. In another example, the reel strip may be divided into one or more areas (e.g., 1-N). In one example, there may be two adjacent sections of the reel, containing a first replacement symbol and/or a second replacement symbol (e.g., RPL1 and RPL2). In one example all of the symbols identically transform into the first replacement symbol. In another example, all of the symbols transform into either the first replacement symbol and/or the second replacement symbol. In another example, one or more of the symbols may transform into any number of replacement symbols.

In one example, a method may utilize a conditional probability. In this embodiment, there are several sections of a particular reel that need a replacement symbol. For example, suppose there are four sections—denoted as RI, R2, R3, and R4. At the start of the game, the machine may determine which symbol RI will become through a weighted look-up of the random number generator ("RNG"). Each symbol may also have its own fixed table that may determine the probability that the replacement symbol will continue into the R2, R3, and R4 sections of the reel. This table may vary depending on the symbol chosen. In one example, for RI this may help to prevent good paying symbols from becoming too large of a stack, and encourages lesser-paying symbols from becoming too small of a stack.

In another example, the method may be utilized in game play so that M1 (e.g., a first symbol) is the best-paying symbol, and the TEN symbol (e.g., a second symbol) is the worst paying. In one example, a symbol (e.g., RIs) may be chosen to be replaced by the M1 symbol. In this example, the probability table may be configured so that the stack symbol may continue beyond RI and into R2, R3, and R4 with the following probabilities:

. . . M1 will replace RI only - - - 25% of the time;

. . . M1 will replace RI and R2 - - - 30% of the time;

. . . M1 will replace RI, R2, and R3 - - - 22.5% of the time; and

. . . M1 will replace RI, R2, R3, and R4 - - - 22.5% of the time.

In this example, this yields an average of 9.7 M1 symbols on this particular reel per spin in which M1 is chosen as the RI symbol. The R2, R3, and R4 that are not modified into M1 may be transformed into another symbol.

In another example, where the symbol (e.g., RIis) is chosen to be replaced by the TEN symbol. The probability that the TEN symbol continues may be better; since the payout (e.g., prize) associated with the TEN symbol is less than the M1 symbol. In this example, the probability table may be configured so that the stack symbol may continue beyond RI and into R2, R3, and R4 with the following probabilities:

. . . TEN will replace RI only - - - 10% of the time;

. . . TEN will replace RI and R2 - - - 18% of the time;

. . . TEN will replace RI, R2, and R3 - - - 18% of the time; and

. . . TEN will replace RI, R2, R3, and R4 - - - 54% of the time.

In this example, this yields an average of 12.64 TEN symbols on a particular spin for this reel. This achieves about 30% more stack for the TEN symbol than for the M1 symbol.

These examples show that the size of the stacks per symbol may be controlled, which allows for enhanced control of hit frequency, volatility, and overall payback.

In another example, a method may utilize a fixed size per reel functionality with a gaming machine. In this example, rather than randomly determine the length of stack based on the RI symbol chosen, the symbol chosen may determine the length of the stack.

For example, if a reel has 20 replacement symbols, these replacement symbols may be uniquely identified (e.g., RI, R2, R3, . . . R20). When one of these symbols is chosen as a replacement symbol for the particular reel, the symbol automatically knows exactly how many symbols will be replaced. The remainder is picked randomly through an existing mechanic.

In this example, the reel has 20 replacement symbols, numbered RI-R20. In one example, when the game starts, M2 was chosen to be the replacement symbol for that reel; the look-up table may show that M2 will replace 12 symbols. The game therefore replaces the first 12 symbols, and will randomly determine what the remaining 8 symbols will be independently of each other. This method may allow the game to control the size of the stacks per symbol, which allows for enhanced flexibility to customize a game for hit frequency, volatility, and overall payback. In addition, this method has the ability to have the excess stack symbols which are not a contiguous stack.

In another embodiment, rather than fixing the length of the stack for a particular symbol, it could also be random selection. In the example above, M2 was chosen and M2 was determined to occupy 12 spots on the stack. Rather than use a fixed number such as 25, a second random look-up could occur; first it picks the symbol (M2) in this case, and then it would pick from several outcomes. For example, a 25% chance that 10 spots would be occupied, a 25% chance that 12 spots would be occupied, and a SO % chance that 14 spots would be occupied. This would add more of a random feel to the game.

In various examples, expanding and/or diminishing the size of the synchronized reel length depending on the power of the symbol chosen may provide exciting, varying, and/or more profitable game play.

Figure 6B:
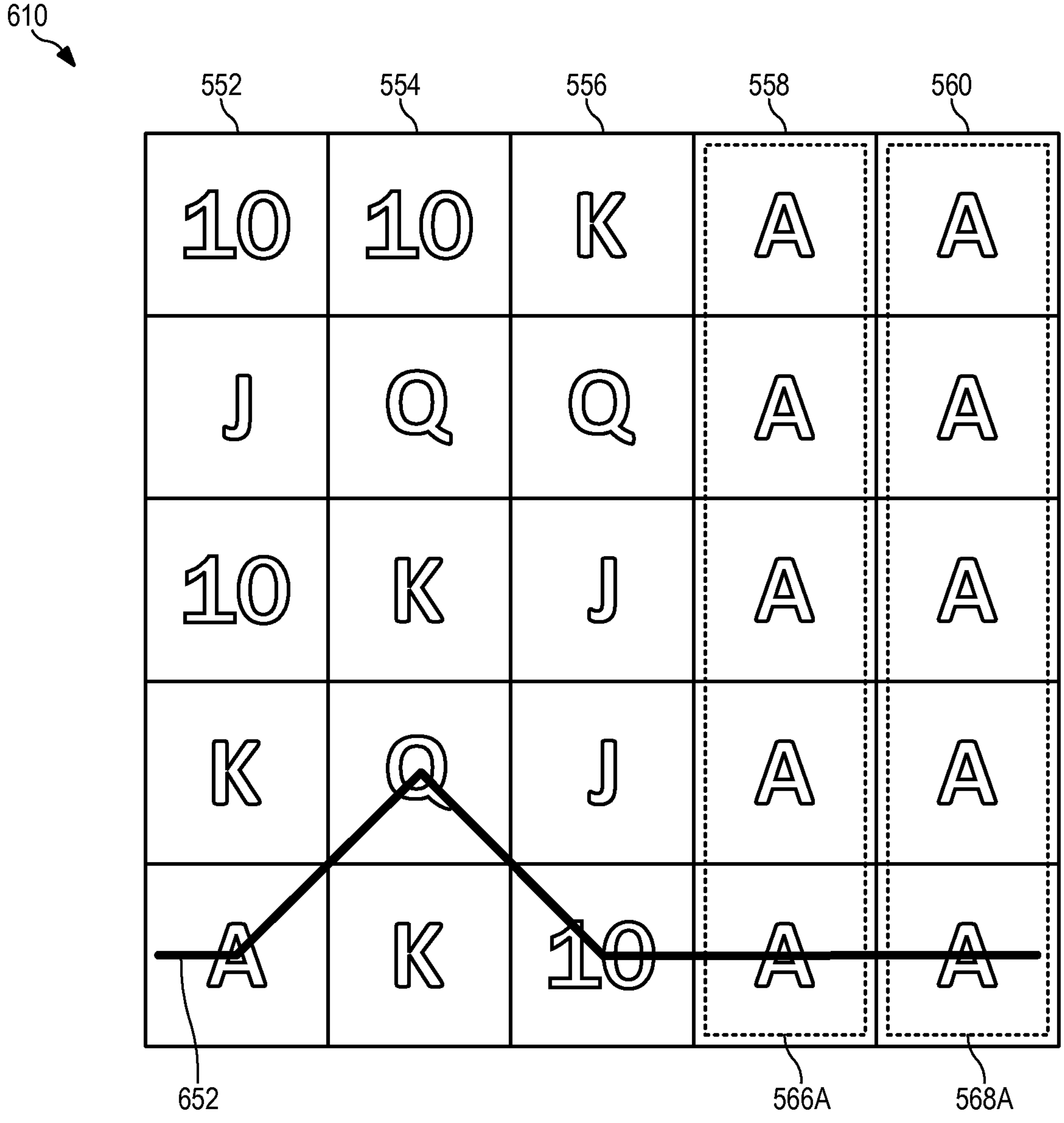
FIG. 6B is an illustration of a quasi-persistent synchronized reel gaming functionality on an exemplary gaming system, according to one embodiment.

In FIG. 6B, an illustration of a quasi-persistent synchronized reel gaming functionality 610 on an exemplary gaming system is shown, according to one embodiment. In this example, the symbols on fourth reel 558 and fifth reel 560 were held (which is represented by reference numbers 566A and 568A) and the symbols on first reel 552, second reel 554, and third reel 556 were replaced. In this example, a first payline 652 may show that no winning combination was obtained by replacing the symbols in first reel 552, second reel 554, and third reel 556. In another example, the queen and the ten on first payline 652 may have been an Ace, which would have resulted in a winning outcome.

Figure 6C:
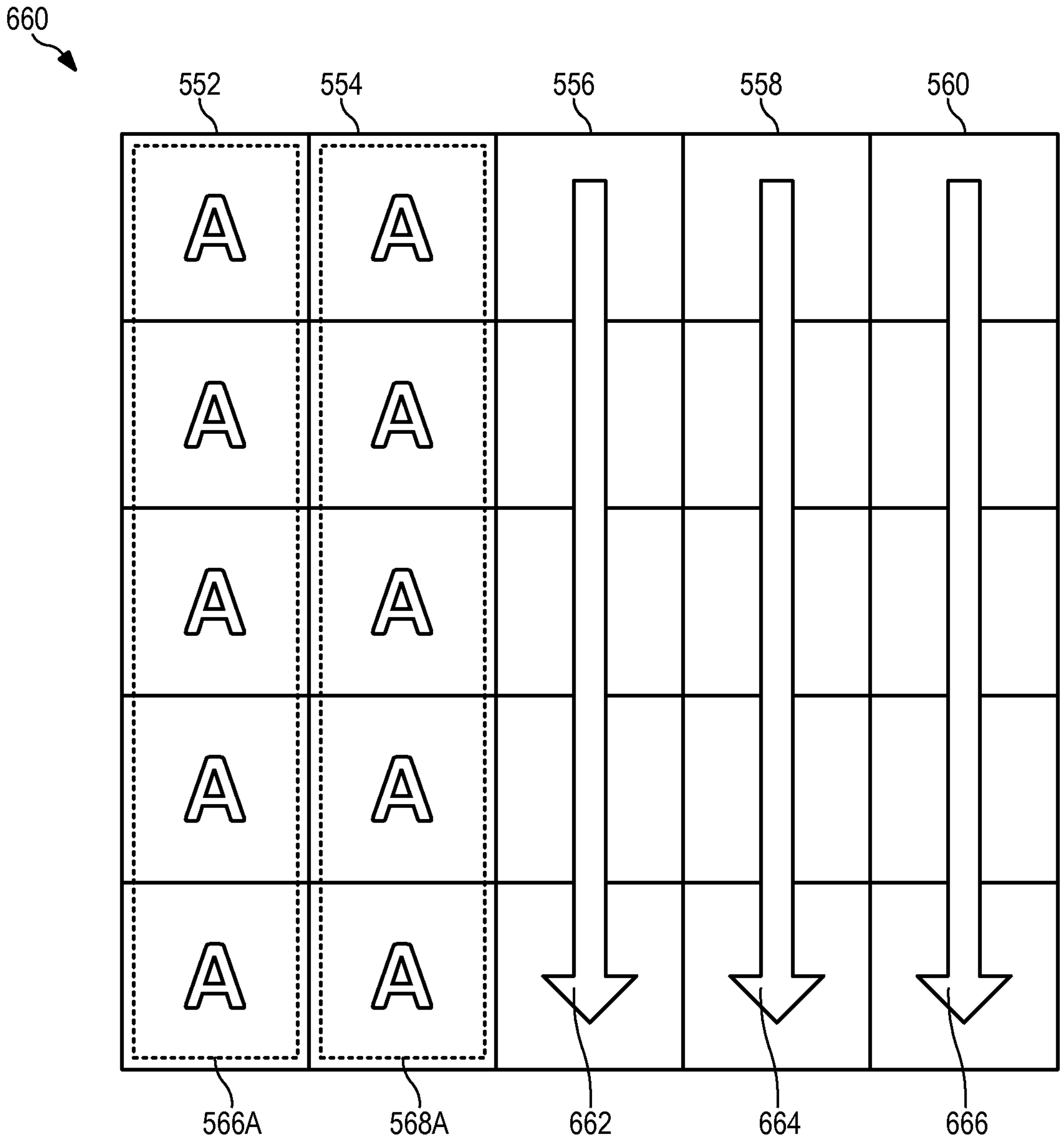
FIG. 6C is another illustration of a quasi-persistent synchronized reel gaming functionality on an exemplary gaming system, according to one embodiment.
Figure 6D:
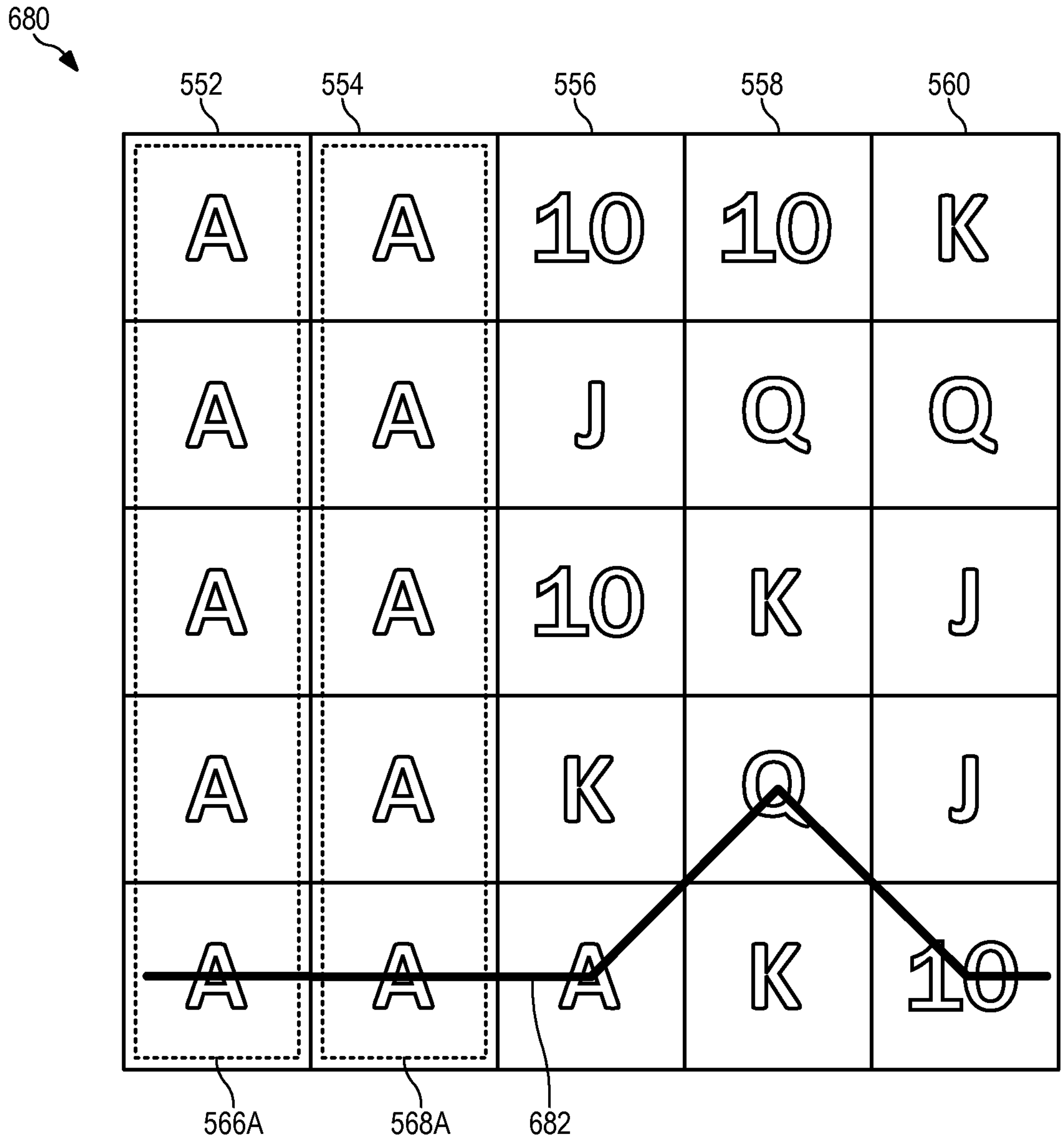
FIG. 6D is another illustration of a quasi-persistent synchronized reel gaming functionality on an exemplary gaming system, according to one embodiment.

In FIG. 6C, an illustration of a quasi-persistent synchronized reel gaming functionality 660 on an exemplary gaming system is shown, according to one embodiment. In this example, the symbols on first reel 552 and second reel 554 are held (which is represented by reference numbers 566A and 568A) and the symbols on third reel 566, fourth reel 558, and fifth reel 560 are respun and/or replaced with one or more replacement symbols (which is represented by reference numbers 662, 664, and 666). In this example, a second payline 682 may be a winning outcome because there are three Aces in a row (see FIG. 6D).

Figure 6E:
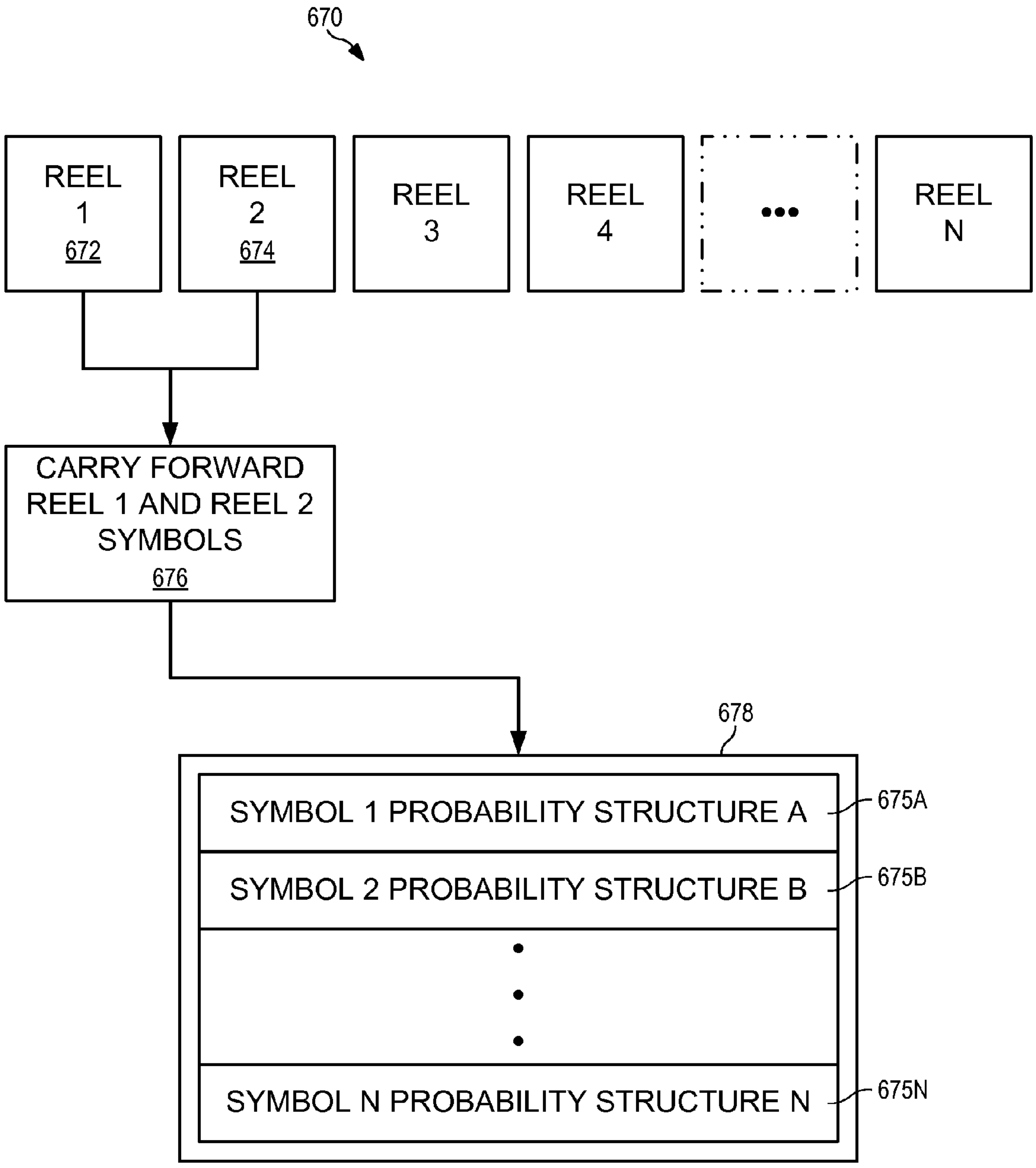
FIG. 6E is another illustration of a quasi-persistent synchronized reel gaming functionality on an exemplary gaming system, according to one embodiment.

In FIG. 6E, an illustration of a quasi-persistent synchronized reel gaming functionality 670 on an exemplary gaming system is shown, according to one embodiment. In this example, the game play has a plurality of reels (e.g., 1-N). In this example, the symbols on a first reel 672 and a second reel 674 are being held which is stated as carry forward reel 1 and reel 2 symbols 676. The system and/or method then determines the probability of one or more symbols being replaced and/or placed on reels 3 to N. This may occur via a first look-up table 678. For example, a first probability structure 675A may indicate that symbol 1 601 has a 50% probability of being utilized on a reel 3 602, symbol 1 601 has a 30% probability of being utilized on a reel 4 604, . . . , and a 1% probability of being utilized on reel N 606 (see FIG. 6F). In another example, a random number generator can be utilized in isolation and/or in combination with this example.

Figure 6F:
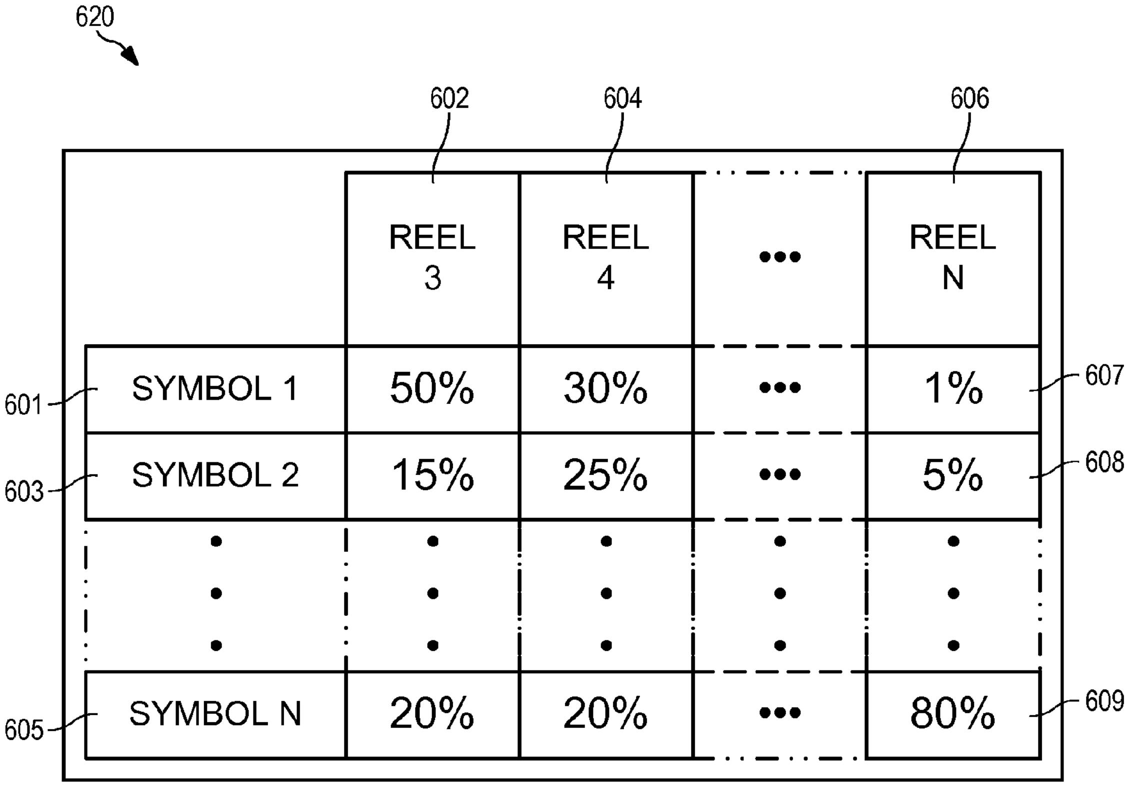
FIG. 6F is another illustration of a quasi-persistent synchronized reel gaming functionality on an exemplary gaming system, according to one embodiment.

In FIG. 6F, an illustration of a quasi-persistent synchronized reel gaming functionality 620 on an exemplary gaming system is shown, according to one embodiment. In this illustration, one or more symbol probability structures (e.g., 601, 603, . . . , 605) are shown. In this example, one or more probability amounts (e.g., 607, 608, . . . , 609) may be shown. In another example, a second probability structure 675B may indicate that a symbol 2 603 has a 15% probability of being utilized on reel 3 602, symbol 2 603 has a 25% probability of being utilized on reel 4 604, . . . , and a 5% probability of being utilized on reel N 606. In another example, an Nth probability structure 675N may indicate that a symbol N 605 has a 20% probability of being utilized on reel 3 602, symbol N 605 has a 20% probability of being utilized on reel 4 604, . . . , and a 80% probability of being utilized on reel N 606.

Figure 6G:
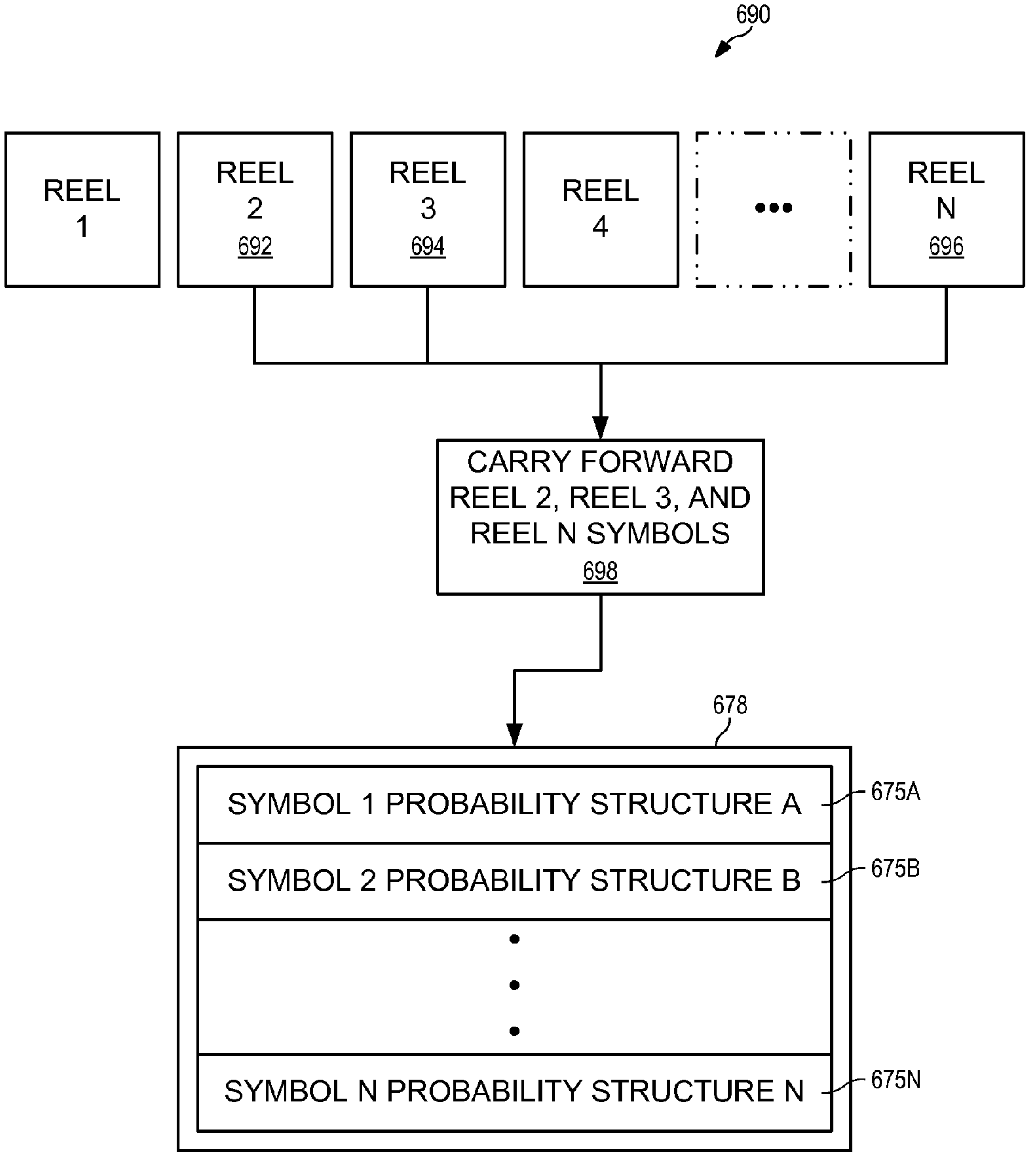
FIG. 6G is another illustration of a quasi-persistent synchronized reel gaming functionality on an exemplary gaming system, according to one embodiment.

In FIG. 6G, an illustration of a quasi-persistent synchronized reel gaming functionality 690 on an exemplary gaming system is shown, according to one embodiment. In this example, the game play has a plurality of reels (e.g., 1-N). In this example, the symbols on a second reel 692, a third reel 694, and an Nth reel 696 are being held which is stated as carry forward reel 2, reel 3, and reel N symbols 698. The system and/or method then determines the probability of one or more symbols being replaced and/or placed on reels 1 and 4 to N−1. This may occur via first look-up table 678 and/or via a random number generator. In one example, the symbol selections may be chosen in such a way that the overall payback of the game remains a constant value.

In one example, first reel include a plurality of individual replacement areas (e.g., a first replacement area, a second replacement area, a third replacement area, a fourth replacement area, a fifth replacement area, a sixth replacement area, a seventh replacement area, an eight replacement area, a ninth replacement area, a tenth replacement area, and/or an Nth replacement area). In one example, one or more of the reels may have a plurality of replacement areas. For example, first reel may have ten replacement areas, second reel may have five replacement areas, third reel may have twenty replacement areas, and/or Nth reel may have one hundred replacement areas.

In this example, Nth reel has a plurality of individual replacement areas (e.g., a first replacement area, a second replacement area, a third replacement area, a fourth replacement area, a fifth replacement area, a sixth replacement area, a seventh replacement area, an eight replacement area, a ninth replacement area, a tenth replacement area, and/or an Nth replacement area).

Figure 7:
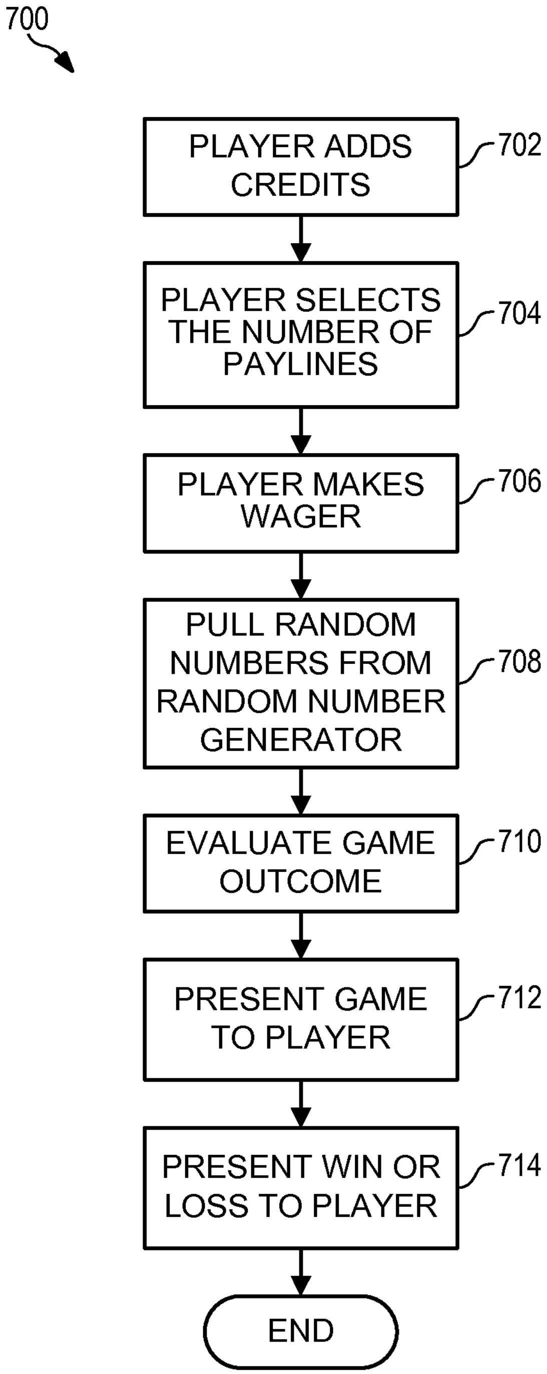
FIG. 7 is a flow diagram for game play, according to one embodiment.

FIG. 7 is a process flowchart of one example of a primary game play 700 on an electronic gaming system, according to one embodiment. The method may include the step of a player adding credit to the electronic gaming system (step 702). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 704, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 706, the player makes a wager on the game. In one embodiment, the wager may be a multiple of the number of paylines selected at step 704. In another embodiment, the wager may not be a multiple of the number of paylines selected at step 704. In a further embodiment, the wager may include a side-wager (e.g., ante bet), which may, in one example of such an embodiment, be used to make the player eligible to be awarded the extra functionality discussed above. It should be appreciated that in some embodiments, the order of steps 704 and 706 may be not critical, and so for example, a player can select the wager they wish to place, and then select the number of paylines they want it applied to, and that these embodiments are expressly contemplated as being within the scope of the present disclosure.

Continuing to step 708, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 710 and 712, the gaming system utilizes the random numbers pulled at step 708 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 714, the win or loss outcome may be identified for the player. In one embodiment, this step can include additional messaging, which provides information related to the win or loss, such as why the player won or lost. In another embodiment, this step can include identification of the amount of any award earned by the player.

Figure 8:
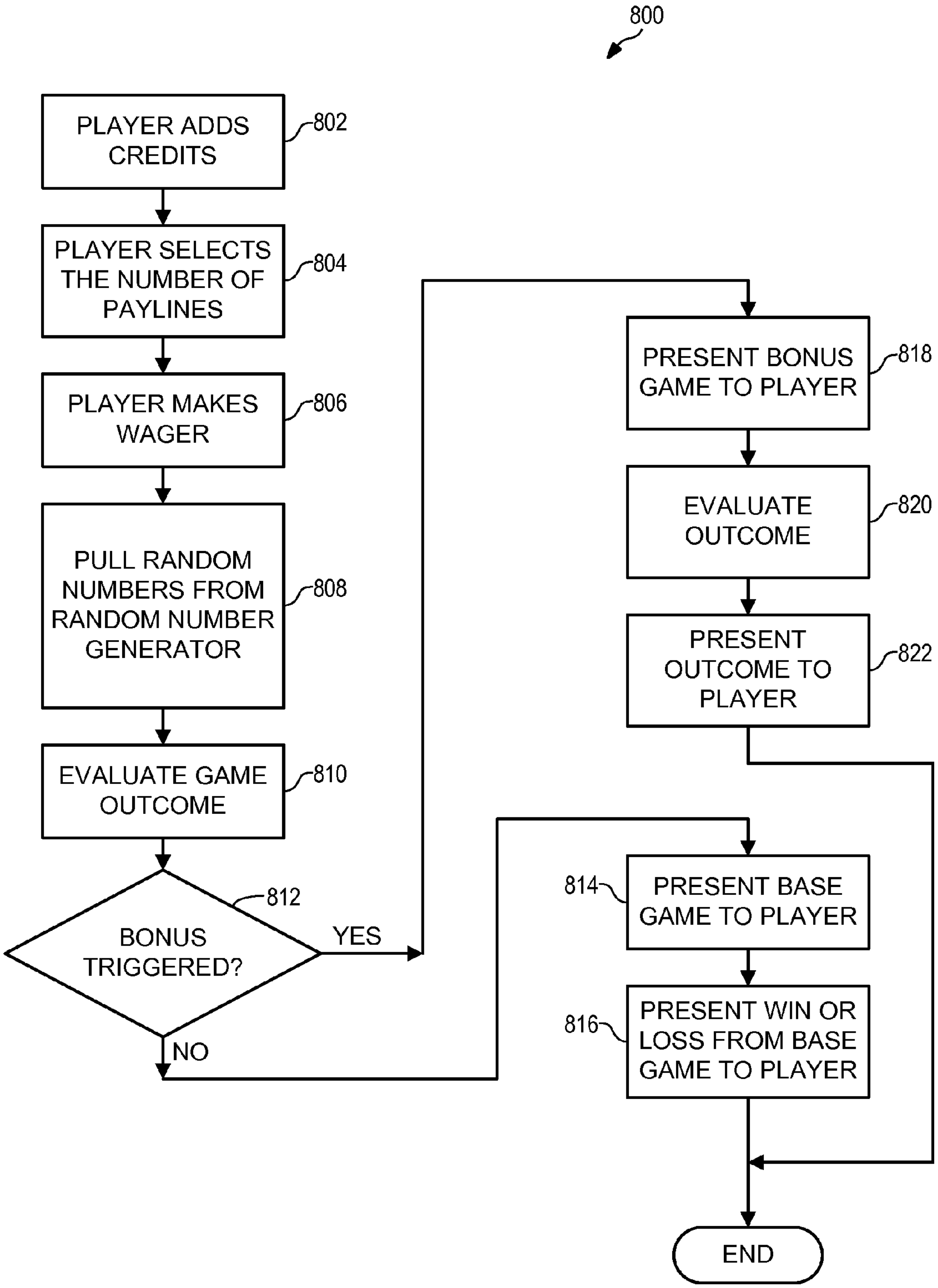
FIG. 8 is another flow diagram for game play, according to one embodiment.

FIG. 8 is a process flowchart of one example of a combined primary and secondary game play 800 on an electronic gaming system, according to one embodiment. The method may include the step of a player adding credit to the electronic gaming system (step 802). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 804, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 806, the player makes a wager on the game. In one embodiment, the wager may be a multiple of the number of paylines selected at step 804. In another embodiment, the wager may not be a multiple of the number of paylines selected at step 804. In a further embodiment, the wager may include a side-wager, which may, in one example of such an embodiment, be used to make the player eligible to be awarded the extra functionality discussed above. It should be appreciated that in some embodiments, the order of steps 804 and 806 may be not critical, and so for example, a player can select the wager they wish to place, and then select the number of paylines they want it applied to, and that these embodiments may be expressly contemplated as being within the scope of the present disclosure.

Continuing to step 808, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 810, the gaming system utilizes the random numbers pulled at step 808 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 812, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the $2^{nd}$, $3^{rd}$ and $4^{th}$ reel. In another example, the bonus game may be triggered if matching symbols are displayed on the $1^{st}$, $2^{nd}$ and $3^{rd}$ reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 814, where the base game may be fully presented to the player. As discussed above, the orders of step 810, 812, and 814 can be changed without affecting the novel concepts disclosed herein.

At step 816, the win or loss outcome of the primary game may be identified for the player. In one embodiment, this step can include additional messaging, which provides information related to the win or loss, such as why the player won or lost. In another embodiment, this step can include identification of the amount of any award earned by the player If it is determined at step 812 that a bonus or secondary game was triggered, then process 800 continues to step 818, where the secondary game may be presented to the player. As discussed above, there are numerous ways to present the secondary or bonus game to the player.

At steps 820 and 822, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player. In one embodiment, instead of the process 800 ending after step 822, the process continues to step 814 so as to finalize the primary game outcome presentation to the player.

Figure 9:
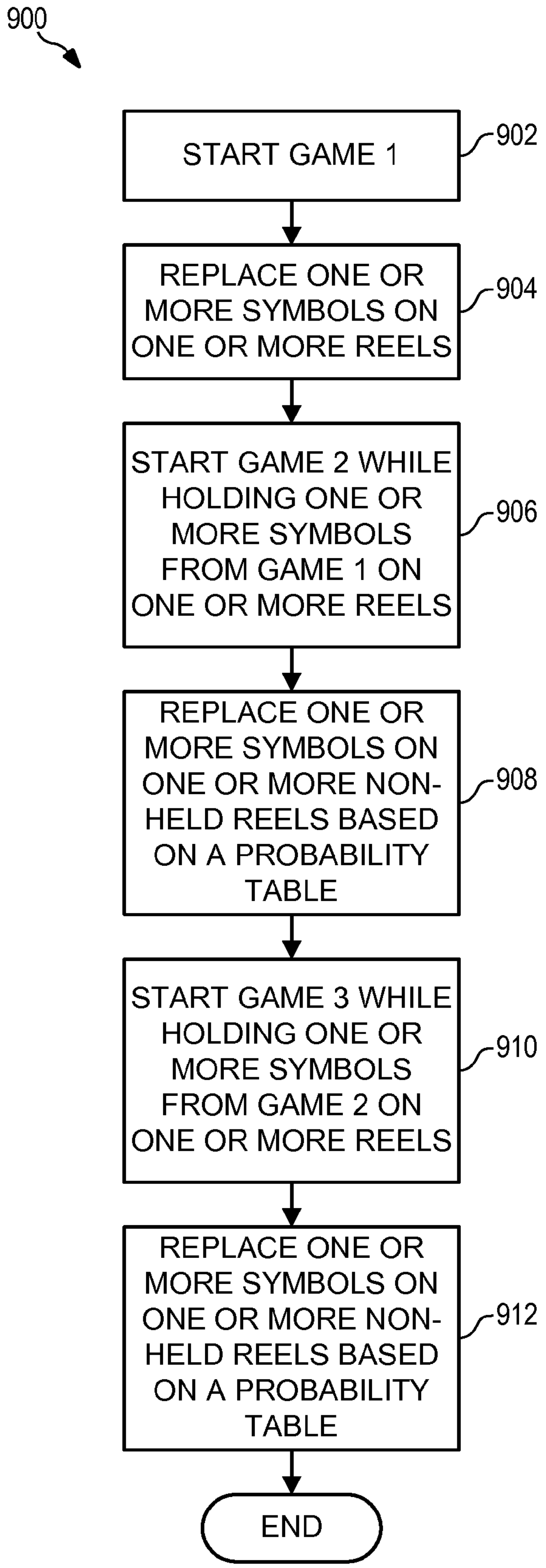
FIG. 9 is another flow diagram for game play, according to one embodiment.

In FIG. 9, another flow diagram for game play 900 is shown, according to one embodiment. In one example, the method may include starting game one play (step 902). The method may include replacing one or more symbols on one or more reels (step 904). The method may include starting game two play while holding one or more symbols from game one play on one or more reels (step 906). The method may include replacing one or more symbols on one or more non-held reels based on one or more probability tables (step 908). The method may include starting game three play while holding one or more symbols from game two play on one or more reels (step 910). The method may include replacing one or more symbols on one or more non-held reels based on a probability table (step 912). The method may generate, display, and/or payout any winning amounts based on a winning occurrence. It should be noted that there may be any amount of game play (e.g., 1-N). In this example, three game plays (e.g., game one play, game two play, and game three play) were utilized.

In another embodiment, the method may include obtaining data relating to a first symbol area. The method may include generating a relationship link from the first symbol area to at least one of a second symbol area and a third symbol area. The method may include obtaining data relating to the second symbol area. The method may include generating a relationship link from the second symbol area to at least one of a third symbol area and a fourth symbol area.

Figure 10:
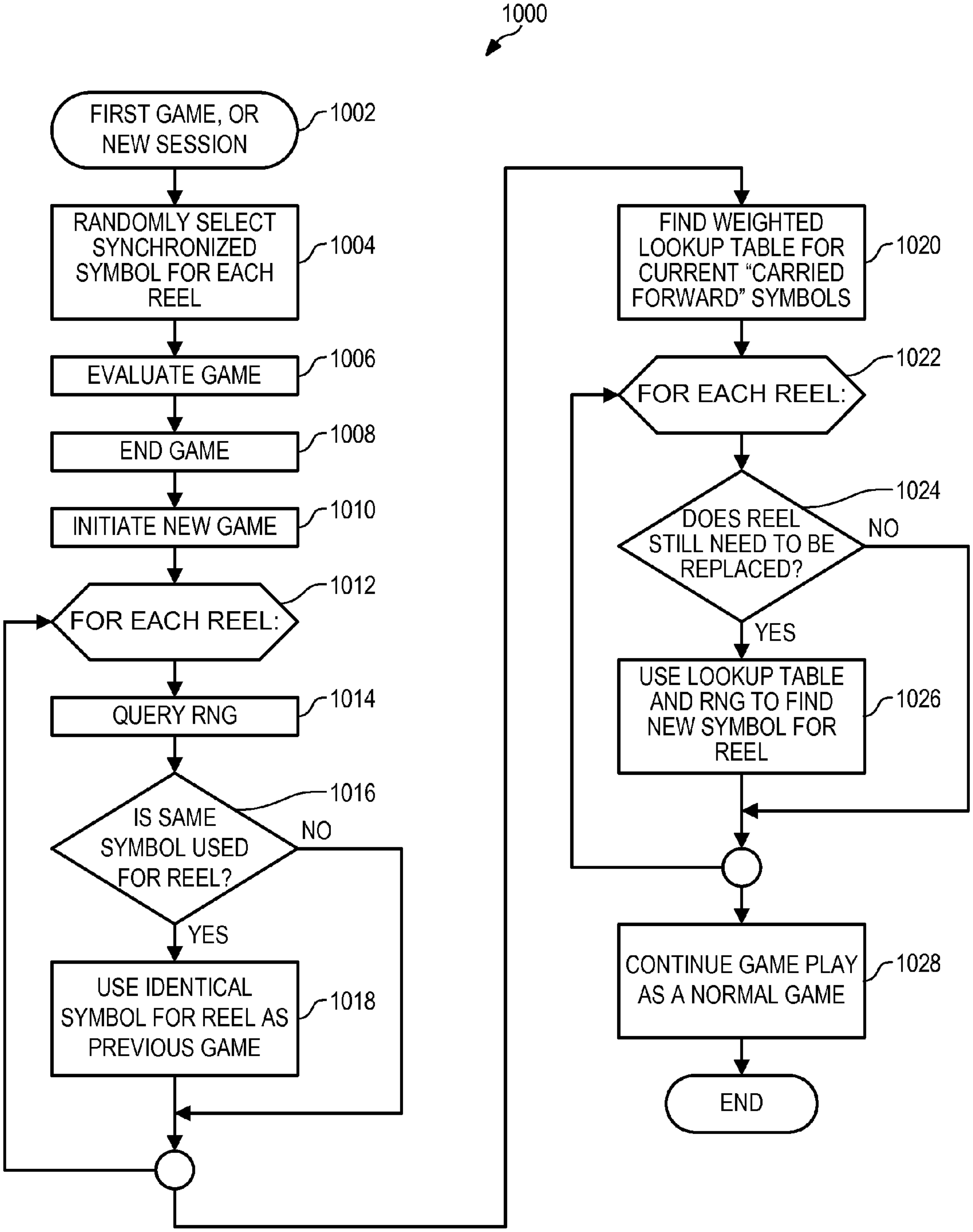
FIG. 10 is another flow diagram for game play, according to one embodiment.

In FIG. 10, another flow diagram for game play 1000 is shown, according to one embodiment. In one example, the method may include initiating a first game and/or a new session (step 1002). The method may include randomly selecting synchronized symbol for each reel (step 1004). The method may include evaluating the game play (step 1006). The method may include ending game play (step 1008). The method may include initiating a new game (step 1010). The method may include for each reel querying the random number generator ("RNG") (steps 1012 and 1014). The method may include determining whether the same symbol for each reel is utilized (step 1016). If the same symbol is not utilized for each reel, then find the weighted lookup table for current one or more carried forward symbols (step 1020). The method may include for each reel determining whether the symbols on the reel still need to be replaced (steps 1022 and 1024). If the symbols do not still need to be replaced on the reels, then the method may continue game play (step 1028). If the symbols do still need to be replaced on the reels, then the method may utilize a lookup table and/or RNG to find new symbols for the one or more reels (step 1026) and continue to step 1028.

If the same symbol is utilized for each reel, then the method may utilize identical symbol for each reel as in the previous game (step 1018). The method may then find the weighted lookup table for current one or more carried forward symbols (step 1020). The method may include for each reel determining whether the symbols on the reel still need to be replaced (steps 1022 and 1024). If the symbols do not still need to be replaced on the reels, then the method may continue game play (step 1028). If the symbols do still need to be replaced on the reels, then the method may utilize a lookup table and/or RNG to find new symbols for the one or more reels (step 1026) and continue to step 1028.

In another embodiment, the method may include determining one or more symbol grouping areas. The method may include determining whether the first symbol grouping area should be replaced. If the first symbol grouping is not to be replaced, then the method may end. If the first symbol grouping is to be replaced, then the method may include replacing the symbols in the first symbol grouping area with a first replacement symbol. The method may include determining whether the second symbol grouping area should be replaced. If the second symbol grouping is not to be replaced, then the method may end. If the second symbol grouping is to be replaced, then the method may include replacing the symbols in the second symbol grouping area with a first replacement symbol.

In another embodiment, the method may include determining one or more symbol grouping areas. The method may include determining whether a first symbol grouping area should be replaced. If the first symbol grouping area should not be replaced, then the method may end. If the first symbol grouping area should be replaced, then the method may include replacing the symbols in the first symbols grouping area with a first replacement symbol. The method may include determining whether a second symbol grouping area should be replaced. If the second symbol grouping area should not be replaced, then the method may end. If the second symbol grouping area should be replaced, then the method may include replacing the symbols in the second symbol grouping area with the second replacement symbol.

In another embodiment, the method may include determining one or more symbol areas. The method may include determining whether the first symbol area should be replaced. If the first symbol area should not be replaced, then the method may end. If the first symbol area should be replaced, then the method may include replacing the symbol in the first symbol area with a first replacement symbol. The method may include determining whether a second symbol area should be replaced. If the second symbol area should not be replaced, then the method may end. If the second symbol area should be replaced, then the method may include replacing the symbols in the second symbol area with the first replacement symbol.

In another embodiment, the method may include determining one or more symbol areas. The method may include determining whether a first symbol area should be replaced. If the first symbol area should not be replaced, then the method may end. If the first symbol area should be replaced, then the method may include replacing the symbols in the first symbol area with a first replacement symbol. The method may include determining whether a second symbol area should be replaced. If the second symbol area should not be replaced, then the method may end. If the second symbol area should be replaced, then the method may include replacing the symbols in the second symbol area with the second replacement symbol.

It should be noted that any of the embodiments in this disclosure with one symbol may be replaced by one or more symbols.

In another example, the funding for the bonus may be based on an ante bet. In one example, a player may place an ante bet on one or more of the paylines to trigger the quasi-persistent synchronized reel game functionality. The size of the prize may be based on the bet level, according to one embodiment.

In one embodiment, the gaming system may include one or more display devices. In another embodiment, the gaming system may include one or more input devices. In a further embodiment, the gaming system may include one or more memory devices. In another embodiment, the gaming system may include one or more processors. In a further embodiment, the gaming system may include instructions on the processor which causes the processor to operate with at least one display device and at least one input device to determine a wager place by a player of the electronic gaming system, determine a plurality of primary game symbols to display in a plurality of symbol positions for a play of the primary game, cause the at least one display device to display the determined primary game symbols in the plurality of symbol positions, and/or determine if a secondary game is triggered. When the secondary game is triggered the at least one display device may display a plurality of matching primary game symbols in each of a predetermined plurality of vertically-adjacent symbol positions and/or a predetermined plurality of horizontally-adjacent symbol positions. The one or more processors may upon a determination that the secondary game is triggered, determine a plurality of secondary game symbols to display, cause the at least one display device to replace each of the matching primary game symbols determined to have triggered the secondary game with the determined plurality of secondary game symbols, determine a secondary game outcome based at least in part on the displayed plurality of secondary game symbols, and/or cause the gaming system to provide any awards determined to be awarded.

The matching symbols may be visually identical symbols. The number of determined secondary game symbols may equal the number of primary game symbols. Each of the secondary game symbols may be displayed at each of the primary game symbol positions determined to have triggered the secondary game. Each of the vertically-adjacent matching primary game symbols may be displayed as part of a single reel. The gaming system may cause an event notification to be displayed on the at least one display device. The at least one memory device may be a server memory.

In one embodiment, a method of providing gaming options via an electronic gaming system is utilized. This method may include determining a wager player by a player of the gaming system. This method may include determining a plurality of primary game symbols to display in a plurality of symbol positions for a play of a primary game. This method may cause at least one display device to display the determined primary game symbols in the plurality of symbol positions. This method may include determining if a secondary game is triggered. This method may include, upon determining that a secondary game is triggered, determining a plurality of secondary game symbols to display, and/or may further cause a plurality of matching primary game symbols to be replaced by the determined secondary game symbols. This method may include determining a secondary game outcome based at least in part on the displayed plurality of secondary game symbols. This method may include causing the gaming system to provide any awards determined to be awarded.

In one embodiment, the electronic gaming system may include at least one display device, at least one input device, at least one memory device, and/or at least one processor. In one embodiment, the at least one processor may receive instructions from the at least one memory device, and to operate with the at least one display device and the at least one input device to display a plurality of reels associated with a plurality of primary game symbols, to display the reels spinning, to display the reels stopping, and/or to determine if a secondary game is triggered. In one embodiment, if the secondary game is triggered, the gaming system may replace at least two adjacent reels with an equal number of secondary game reels, display the spinning of the secondary game reels, display the secondary game reels stopping, and/or providing any awards determined to be awarded.

In one example, the system and/or method may determine that a key value (e.g., winning amount) is 10,000 credits. The key value may be the amount of credits (and/or multipliers and/or free spins and/or any other item of value) won. In this example, the 10,000 credit key value number may be utilized to determine one or more presentations associated with this 10,000 credits key value number. There may be presentation indexes numbered 0 to N associated with the 10,000 credits key value number.

The system and/or method may select (e.g., randomly, by a predetermined pattern, shuffle, combination thereof, and/or any other selection method) one or more of the presentations based on the key value.

In one example, the method may include determining a winning credit amount. The method may include looking up one or more presentations related to the winning credit amount. The method may include modifying the set of presentations relating to the winning credit amount based on one or more criteria. The method may include selecting a presentation from the modified set of presentations based on one or more criteria. The method may include displaying the selected presentation. The method may end.

For example, the presentation may be modified to include an advertisement, a movie trailer, a movie promotion, a casino event, a casino promotion, an actor's image, the player's image, etc.

In one embodiment, the electronic gaming device may include a plurality of reels, one or more paylines formed on at least a portion of the plurality of reels, a memory, and a processor. The memory may include a presentation module. The presentation module may include a plurality of presentations. The processor may determine a value. The processor may select one or more presentations based on the value.

In another example, the processor may randomly select the one or more presentations related to the value. In an example, the processor may select the one or more presentations related to the value in a predetermined pattern.

In another example, the value may be based on an input from a player. In an example, the processor may display a presentation based on one or more presentations. In another example, the processor may display a themed presentation based on one or more criteria. In an example, the themed presentation may be based on an advertisement and/or any other theme.

In another embodiment, the method of providing gaming options via an electronic gaming device may include receiving one or more primary wagers on one or more paylines, starting a bonus game, determining one or more values, and/or selecting one or more presentations based on the one or more values.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., the quasi-persistent synchronized reel game functionality, repeat paylines, patterns, scenarios, etc.). The selected paylines may be based on data received from a player. The processor may determine a selected payline's payout based on the one or more selected paylines (e.g., the quasi-persistent synchronized reel game functionality, repeat paylines, patterns, scenarios, etc.).

In another example, the display may shade one or more non-selected paylines. The electronic gaming device may include a player preference input device. The player preference input device may modify a game configuration based on data from an identification device. The processor may multiply a prize value based on a selected payline occurrence.

In another example, the method may include obtaining a player preference data and modifying a game configuration based on the player preference data. The method may include receiving data from at least one of a server and one or more gaming devices.

In another example, the processor may determine a payout based on the primary wagers. The processor may receive one or more secondary wagers on one or more patterns. The electronic gaming device may include a display, which may display a game status image.

In another embodiment, the electronic gaming system may include a server. The server may include a server memory, a server processor, and a signage server. The server memory may include historical gaming data. The server processor may generate a gaming message based on the historical gaming data. The signage server may transmit the gaming message.

In another example, the gaming message may be transmitted to an internal display of a gaming entity. The internal display may be a non-gaming device display. The gaming message may be transmitted to an external display of a gaming entity. The external display may be located outside of a gaming entity. The gaming message may be transmitted to at least one of a top display, a main display, and a side display.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it could be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

The disclosed features may be part of the base game and/or a bonus game. In addition, the disclosed features may be part of a base bet and/or may require an additional side bet (e.g., ante bet).

In one embodiment, the electronic gaming device may include a plurality of reels. One or more paylines may be formed on at least a portion of the plurality of reels. The electronic gaming device may include a memory. The memory may include one or more quasi-persistent synchronized reel game play structures. The electronic gaming device may include a processor. The processor may initiate the one or more quasi-persistent synchronized reel game play structures based on one or more triggering events.

In another example, the one or more initiated quasi-persistent synchronized reel game play structures are further based on one or more characteristics of the one or more triggering events. In one example, the processor may display a first game event. In another example, the first game event may include one or more first game event options. In another example, the processor may receive one or more selections relating to the one or more first game event options.

In one example, the processor may display a second game event based on the one or more selections relating to the one or more first game event options. The second game event may include one or more second game event options. The processor may receive one or more selections relating to the one or more second game event options. The processor may display a third game event based on the one or more selections relating to the one or more second game event options.

In one embodiment, the method of providing gaming options via an electronic gaming device may include receiving one or more wagers on one or more paylines. The method may include determining one or more triggering events. The method may include displaying one or more quasi-persistent synchronized reel game play structures.

In one embodiment, the electronic gaming system may include one or more display devices, one or more input devices, one or more memory devices, and/or one or more processors. The one or more memory devices may include one or more quasi-persistent synchronized reel structures. The one or more processors may receive a plurality of instructions from the one or more memory devices, which when executed by the one or more processors, cause the one or more processors to operate with the one or more display devices to: determine a wager placed by a player of the electronic gaming system; determine a plurality of primary game symbols to display in a plurality of symbol positions; cause the one or more display devices to place the determined primary game symbols in the plurality of symbol positions; initiate one or more of the one or more quasi-persistent synchronized reel structures; determine one or more replacement symbols for the one or more symbols of the plurality of primary game symbols; and/or determine one or more held symbols for one or more sequential game plays.

In another example, the one or more processors may generate one or more random numbers. In one example, the one or more processors may replace the one or more symbols of the plurality of primary game symbols based on the one or more random numbers. In an example, the one or more processors may replace the one or more primary game symbols with the one or more replacement symbols. In one example, the one or more processors may determine a secondary game outcome based at least in part on the displayed replacement symbols. In another example, one or more memory devices may be a server memory. In another example, one or more quasi-persistent synchronized reel structures may have low variance payout profiles. In one example, one or more quasi-persistent synchronized reel structures may have below average variance payout profiles. In one example, one or more quasi-persistent synchronized reel structures may have average variance payout profiles. In one example, one or more quasi-persistent synchronized reel structures may have above average variance payout profiles. In one example, one or more quasi-persistent synchronized reel structures may have high variance payout profiles. In another example, based on information relating to the player, one or more payout profiles (e.g., low, below average, average, above average, and/or high) may be utilized by gaming machine. For example, a player may have indicated via information on a player's card, other player input, and/or gaming company input that the player prefers a specific type (e.g., high variance game play) of game play.

In another example, a method of providing gaming options via an electronic gaming system may include determining a wager placed by a player of the electronic gaming system, determining a plurality of primary game symbols to display in a plurality of symbol positions, placing the determined primary game symbols in the plurality of symbol positions, initiating one or more quasi-persistent synchronized reel structures, determining one or more replacement symbols for one or more symbols of the plurality of primary game symbols, and/or determining one or more held symbols for one or more sequential game plays.

In another example, the method may include generating one or more random numbers. In one example, the method may include replacing the one or more symbols of the plurality of primary game symbols based on the one or more random numbers. In one example, the method may include replacing the one or more primary game symbols with the one or more replacement symbols.

In one example, the method may include determining a secondary game outcome based at least in part on the displayed replacement symbols. In one example, the method may include one or more quasi-persistent synchronized reel structures having one or more low variance payout profiles. In one example, the method may include one of the one or more quasi-persistent synchronized reel structures having one or more below average variance payout profiles.

In one example, the method may include one or more quasi-persistent synchronized reel structures having one or more average variance payout profiles. In one example, the method may include one of the one or more quasi-persistent synchronized reel structures having one or more high variance payout profiles.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system may be powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system may be different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "may," "another example," and/or similar language, should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming system comprising:

a credit device configured to accept an item associated with a monetary value;

one or more display devices;

one or more input devices;

one or more memory devices, the one or more memory devices including one or more quasi-persistent synchronized reel structures; and one or more processors configured to receive a plurality of instructions from the one or more memory devices, which when executed by the one or more processors, cause the one or more processors to:

(a) determine a wager amount placed by a player of the electronic gaming system where the wager amount is subtracted from a credit balance, the credit balance being funded at least in part via the credit device;

(b) determine a first plurality of game symbols to display in a first symbol replacement area on a first reel of a display area on the one or more display devices for a first spin of a game based on at least one of a first number determination and a second number determination;

(c) cause the one or more display devices to place the determined first plurality of game symbols in the first symbol replacement area located on the first reel of the display area on the one or more display devices for the first spin of the game;

(d) determine a second plurality of game symbols based on a utilization of a first number relating to the first number determination;

(e) determine a third plurality of game symbols based on a utilization of a second number relating to the second number determination;

(f) display the second plurality of game symbols on a second symbol replacement area on the first reel of the display area on the one or more display devices for a second spin of the game based on the first number determination;

(g) display the third plurality of game symbols on a third symbol replacement area on the first reel of a display area on the one or more display devices for the second spin of the game based on the second number determination; and (h) determining one or more payouts for at least one of the first spin and the second spin where the credit balance is increased by any determined award amount associated with the one or more payouts.

2. The electronic gaming system of claim 1, wherein the one or more processors are further configured to generate one or more random numbers.

3. The electronic gaming system of claim 2, wherein the one or more processors are further configured to replace one or more symbols of a plurality of game symbols based on the one or more random numbers.

4. The electronic gaming system of claim 3, wherein the one or more processors are further configured to determine a secondary game outcome based at least in part on a displayed replacement symbol.

5. The electronic gaming system of claim 1, wherein one or more held symbols for one or more sequential game plays are based on one or more look-up tables.

6. The electronic gaming system of claim 1, wherein at least one of the one or more quasi-persistent synchronized reel structures has a high variance payout profile.

7. A method of providing gaming options via an electronic gaming system comprising:

(a) receiving via a credit device an item associated with a monetary value;

(b) establishing via one or more processors a credit balance based at least in part on the received item;

(c) receiving via a wager button a wager amount on a play of a game, wherein the wager amount is deducted from the credit balance;

(d) determining a first plurality of game symbols to display in a first symbol replacement area on a first reel of a display area on one or more display devices for a first spin of a game based on at least one of a first number determination and a second number determination;

(e) placing the determined first plurality of game symbols in the first symbol replacement area located on the first reel of the display area on the one or more display devices for the first spin of the game;

(f) determining a second plurality of game symbols based on a utilization of a first number relating to the first number determination;

(g) determining a third plurality of game symbols based on a utilization of a second number relating to the second number determination;

(h) displaying the second plurality of game symbols on a second symbol replacement area on the first reel of the display area on the one or more display devices for a second spin of the game based on the first number determination;

(i) displaying the third plurality of game symbols on a third symbol replacement area on the first reel of the display area on the one or more display devices for the second spin of the game based on the second number determination; and (j) generating via the one or more processors one or more payouts for at least one of the first spin and the second spin where the credit balance is increased by any determined award amount associated with the one or more payouts.

8. The method of claim 7, further comprising generating one or more random numbers.

9. The method of claim 8, further comprising replacing one or more symbols of a plurality of game symbols based on the one or more random numbers.

10. The method of claim 9, further comprising determining a secondary game outcome based at least in part on a displayed replacement symbol.

11. The method of claim 7, wherein at least one of the one or more quasi-persistent synchronized reel structures has a high variance payout profile.

* * * * *